United States Patent [19]

Matsukawa et al.

[11] Patent Number: 5,659,814
[45] Date of Patent: Aug. 19, 1997

[54] CAMERA

[75] Inventors: Nobuo Matsukawa; Sunao Nishioka, both of Tokyo, Japan

[73] Assignee: Nikon Corporation, Tokyo, Japan

[21] Appl. No.: 345,783

[22] Filed: Nov. 22, 1994

[30]     Foreign Application Priority Data

Nov. 24, 1993  [JP]  Japan .................................. 5-293313
Jun. 27, 1994  [JP]  Japan .................................. 6-144511

[51] Int. Cl.⁶ .............................. G03B 3/10; G03B 17/20
[52] U.S. Cl. .............................................. 396/121; 396/296
[58] Field of Search ...................... 354/289.11, 289.12, 354/432, 409, 406, 407, 408; 396/121, 296

[56]     References Cited

U.S. PATENT DOCUMENTS

| | | | |
|---|---|---|---|
| 5,095,798 | 3/1992 | Okada et al. | 84/609 |
| 5,121,152 | 6/1992 | Wagner | 384/402 |
| 5,349,415 | 9/1994 | Nishida | 354/432 |
| 5,365,302 | 11/1994 | Kodama | 354/403 |
| 5,394,168 | 2/1995 | Smith, III et al. | 345/156 |
| 5,414,487 | 5/1995 | Iwasaki | 354/432 |

*Primary Examiner*—Safet Metjahic
*Assistant Examiner*—Eric Nelson

[57]     ABSTRACT

A camera quickly selecting a focus detection region or a light metering region while seeing a finder picture. A region selection member is provided so that an operating surface of the region selection member is substantially parallel to a finder picture.

18 Claims, 21 Drawing Sheets

CAMERA

BACKGROUND OF THE INVENTION

1. Field of the Invention

The present invention relates to a camera for detecting a focus in a plurality of focus detection regions on a photographing picture and, at the same time, metering the light in a plurality of light metering regions.

2. Related Background Art

There have been known a camera in which a plurality of focus detection regions are set on a photographing picture, and a focus is detected by selecting an arbitrary focus detection region therefrom (see, e.g., Japanese Patent Application Laid-open No. 1-288845).

In this type of camera, the plurality of focus detection regions are set in line in a long-side direction of the photographing picture. A selected region is changed in accordance with a rotating direction and a rotational quantity by a setting dial for setting each item of photographing data, thus selecting an arbitrary focus detection region.

FIG. 37 is a rear view of the camera in which the setting dial is disposed on a body rear surface. A setting dial 403 for setting respective items of photographing data is mounted on a rear cover 402 of a camera 401. At the same time, the rear surface of the camera 401 is provided with a variety of operation buttons 404, 405.

In this type of camera, the photographer manipulates these operation members 403 to 405 with a thumb of the right hand, thus setting various items of photographing data. The various items of data of the camera include high-order data such as an aperture, a shutter speed and an exposure compensation and low-order data such as an aperture value, a shutter speed value and an exposure compensation value that are contained in the high-order data. Normally, the high-order data is selected by an operation button disposed in unillustrated other position of the camera 401, and the low-order data corresponding to the selected high-order data is selected by the setting dial 403. Further, the operation buttons 404, 405 provided on the rear surface of the camera incorporate the single functions to fix autofocusing and exposing for only the duration of being operated. The photographer manipulates the operations buttons 404, 405 with the thumb of the right hand, thus operating them.

There has also been known a camera in which a plurality of focus detection regions are set by subdividing a photographing picture in the form of a matrix, and a focus is detected by selecting an arbitrary focus detection region with a track-ball type input member serving as a release button (see U.S. Pat. No. 5,121,152).

However, the number of the focus detection regions increased with the advancement of the autofocus technique, and the focus detection regions are two-dimensionally arranged on the photographing picture. This arrangement causes the following problem inherent in the former camera for selecting the region by use of the setting dial. The selected regions are sequentially changed along the uppermost or lowermost array in the long-side direction of the photographing picture by rotating the setting dial. When reaching the right end or the left end, the selected region is shifted to the second array from above or under and thus similarly sequentially changed. Such a scanning operation has to be performed up to the last array, resulting in a poor operability.

Further, there arises the following problem inherent in the latter camera described above. The track ball type input member serving as the release button is provided on the upper surface of the camera, and, therefore, the focus detection regions on the photographing picture are shifted by the track ball on the assumption that the photographing picture for selecting the focus detection region is formed as if existing on a horizontal plane including the optical axis of a photographing lens. It follows that an arbitrary region is selected therefrom. On the other hand, the finder picture is so formed as to be orthogonal to the optical axis of the photographing lens, and hence it follows that the photographing picture of the track-ball type input member is orthogonal to the finder picture. Consequently, the operating direction of the track ball does not coincide with the shifting direction of the selected region of the finder picture. This leads to a sense of incongruity and a poor operability.

SUMMARY OF THE INVENTION

It is a primary object of the present invention to provide a camera capable of quickly selecting a focus detection region or a light metering region while seeing a finder picture.

Corresponding to FIG. 7's illustration of one embodiment according to the invention of claim 1, there is provided a camera in which a plurality of focus detection regions are two-dimensionally disposed on a photographing picture, comprising: a region selection member 3 for selecting an arbitrary focus detection region from these focus detection regions; a focus detecting device for detecting a focus adjusting state of a photographing lens in the focus detection region selected by the region selection member 3; and a display unit for displaying the focus detection region selected by the region selection member 3 on a finder picture. The region selection member 3 is provided so that an operation surface of the region selection member 3 is substantially parallel to the finder picture.

In a camera according to claim 2, the finder picture is so set as to be substantially orthogonal to the optical-axis direction of the photographing lens, and the region selection member 3 is provided on a rear surface of the camera.

In a camera according to claim 3, the region selection member 3 is made shiftable in a direction substantially orthogonal to the finder picture. When the region selection member 3 is intruded in a direction substantially right-angled to the finder picture, and when operated on the surface substantially parallel to the finder picture, the focus detecting device selects the focus detection region corresponding to this operating direction.

A camera according to claim 4 further comprises: a focus adjusting mode selection member for selecting a first focus adjusting mode in which a focus of the photographing lens is adjusted based on the focus adjusting state of the photographing lens that is detected in the focus detection region selected by the region selection member 3 and a second focus adjusting mode in which the focus of the photographing lens is adjusted by a predetermined algorithm on the basis of the focus adjusting state of the photographing lens that is detected in each of the plurality of focus detection regions; and a focus adjusting mode setting device for setting the selected focus adjusting mode when the region selection member 3 is intruded in the direction substantially right-angled to the finder picture and when the focus adjusting mode selection member is selectively operated.

According to the invention of claim 5, there is provided a camera in which a plurality of light metering regions are arranged on a photographing picture, comprising: a region selection member 3 for selecting an arbitrary light metering region from these light metering regions; a light metering device for detecting a luminance of an object in the light metering region selected by this region selection member 3; and a display unit for displaying the light metering region selected by the region selection member 3 on a finder picture. The region selection member 3 is provided so that the operating surface of the region selection member 3 is substantially parallel to the finder picture. The above object is thereby accomplished.

According to the invention of claim 6, there is provided a camera in which a plurality of focus detection regions are two-dimensionally arranged on a photographing picture, and, at the same time, a plurality of light metering regions are two-dimensionally arranged, the camera comprising: a region selection member 3 for selecting an arbitrary focus detection region from the plurality of focus detection regions or an arbitrary light metering region from the plurality of light metering regions; a focus detecting device for detecting a focus adjusting state of a photographing lens in the focus detection region selected by this region selection member 3; a light metering device for detecting a luminance of an object in the light metering region selected by the region selection member 3; and a display unit for displaying the light metering regions or the focus detection region selected by the region selection member 3 on the finder picture. The region selection member is provided so that an operating surface of the region selection member is substantially parallel to the finder picture. The above object is thereby accomplished.

In a camera according to claim 7, the focus detection regions are previously made corresponding to the light metering regions. When the region selection member 3 selects the focus detection region, the light metering region corresponding to the selected region is automatically selected by the light metering device.

In a camera according to claim 8, the focus detection regions are previously made corresponding to the light metering regions. When the region selection member 3 selects the light metering region, the focus detection region corresponding to the selected region is automatically selected by the focus detecting device.

In a camera according to claim 9, the region selection member has: a data setting dial for setting each item of data in accordance with a rotating direction and a rotational quantity; a support member for supporting this data setting dial in such a manner as to be shiftable on the surface substantially parallel to the finder picture; and a detection member for detecting a shifting direction of the data setting dial. A region corresponding to the shifting direction of the data setting dial is thereby selected.

In a camera according to claim 10, the region selection member has: a data setting dial for setting each item of data in accordance with a rotating direction and a rotational quantity; a support member for supporting the data setting dial in such a manner as to be tiltable on the surface substantially parallel to the finder picture; and a detection member for detecting a tilting direction of the data setting dial. A region corresponding to the tilting direction of the data setting dial is thereby selected.

The region selection member 3 is provided so that the operating surface of the region selection member 3 is substantially parallel to the finder picture, and there is selected the focus detection region corresponding to the operating direction of this region selection member 3. The shifting direction of the region selection member 3 coincides with the shifting direction of the selected region of the finder picture. The region can be accurately and quickly changed while seeing the selected region displayed on the finder picture, whereby the operability can be improved. Furthermore, in the ordinary single-lens reflex camera, the photographer views through the finder from the rear surface of the camera, and, therefore, the operating surface of the region selection member 3 is substantially parallelized to the finder picture by providing the region selection member 3 on the rear surface of the camera. The same effects as the above-mentioned are thereby obtained, and, besides, the region selection member 3 can be operated with the thumb while holding the camera, thereby improving the operability.

Further, when intruding the region selection member 3 in the direction orthogonal to the finder picture and operating it on the surface parallel to the finder picture, the focus detection region corresponding to that operating direction is selected. Consequently, the selected region is not changed even when carelessly shifting the region selection member, thus preventing a misoperation.

The region selection member 3 is intruded in the direction orthogonal to the finder picture, and the focus adjusting mode is set by operating the focus adjusting mode selection member. The focus adjusting mode selection member is therefore allowed to serve as a command dial for setting each item of photographing data. This eliminates the necessity for providing a dedicated operation member.

Further, the region selection member 3 serves to both select the focus detection region and select the light metering region, and, hence, there is no necessity for providing the separate dedicated operation member. Also, the focus detection regions are beforehand made corresponding to the light metering regions, and, when the focus detection region is selected by the region selection member 3, the corresponding light metering region is automatically selected. When the light metering region is selected by the region selection member 3, the corresponding focus detection region is automatically selected. With this operation, when selecting either the focus detection region or the light metering region, the focus and the exposure can be automatically set in that selected region, thereby improving the operability.

Moreover, the region selection member also serves as the data setting dial for setting each item of photographing data. This data setting dial is so constructed as to be shiftable or tiltable on the surface substantially parallel to the finder picture. The region is selected corresponding to the shifting or tilting direction thereof. This also eliminates the necessity for providing the dedicated region selection member. It is therefore possible to reduce the costs and set the respective items of photographing data as well as selecting the region while viewing through the finder. The operability is thereby ameliorated.

Note that the operation and the elements for solving the above problems of assistance in explaining the construction of the present invention involve the use of the drawings of the embodiments to facilitate the understanding of the present invention, but this does not limit the present invention to the embodiments which follow.

DETAILED DESCRIPTION OF THE PREFERRED EMBODIMENTS

First Embodiment

Figure 1:
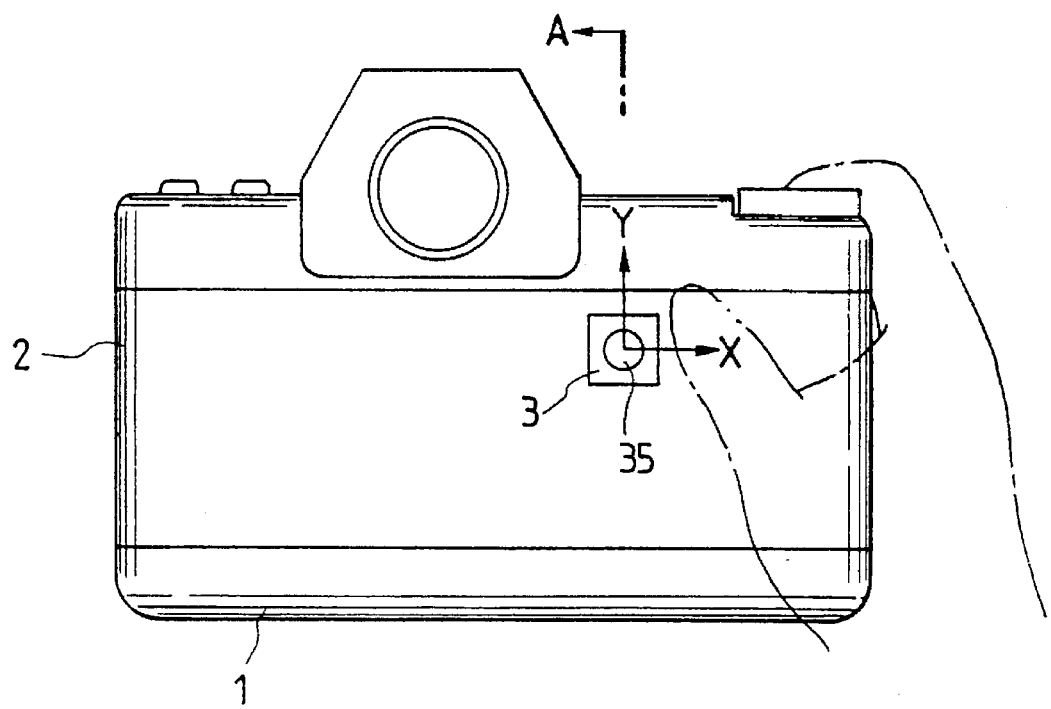
FIG. 1 is a rear view of a camera in a first preferred embodiment according to the present invention.
Figure 2:
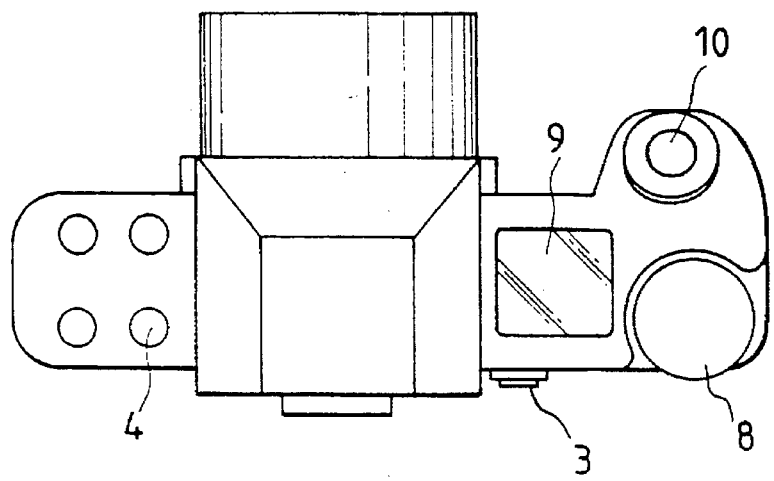
FIG. 2 is a top view of the camera shown in FIG. 1.

FIG. 1 is a rear view illustrating a camera in a first present embodiment according to the present invention. FIG. 2 is a top view illustrating the camera in the first embodiment.

A rear cover 2 of a camera body 1 is provided with a slidable region selection button 3. The region selection button 3 is provided in such a position as to be manipulated by a thumb (indicated by one-dotted line) when holding the camera body 1. Provided further on the upper surface of the camera body 1 are a light metering mode setting button 4, a data setting dial 8, an external display unit 9 and a release button 10.

The data setting dial 8 is connected to a pulse generator which will be mentioned later and inputs various items of data of the camera by causing the pulse generator to generate pulses corresponding to rotating operations. The pulse generator generates a unit pulse per unit rotation of the data setting dial 8 regulated by a click stop. When rotating the data setting dial 8 while depressing the light metering mode selection button 4, an arbitrary mode can be selected from a plurality of light metering modes including a partial light metering mode.

Figure 3:
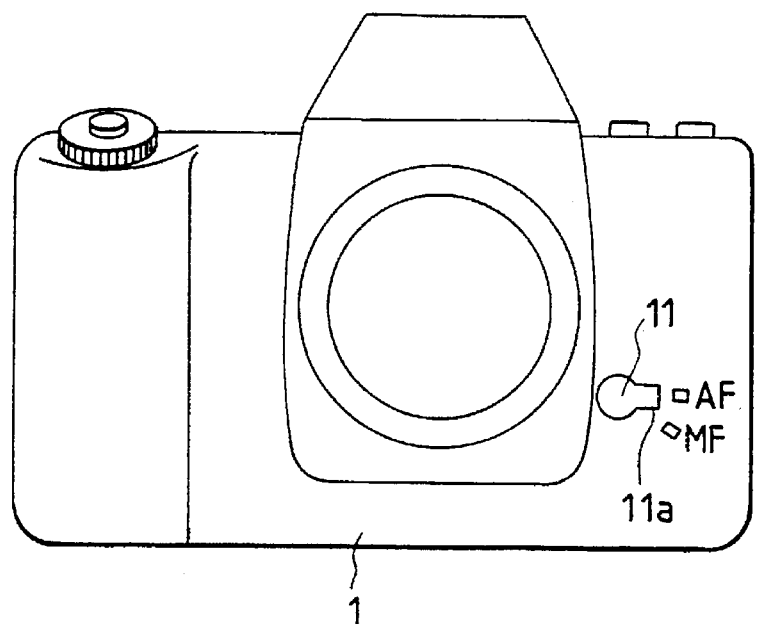
FIG. 3 is a front view of the camera illustrated in FIG. 1.

FIG. 3 is a front view of the camera body 1.

A mode switching lever 11 is an operation member for switching over an autofocus (AF) mode and a manual focus mode (MF). In FIG. 3, a lever portion 11a is adjusted to an (AF) mark, thus setting the autofocus mode.

Figure 4:
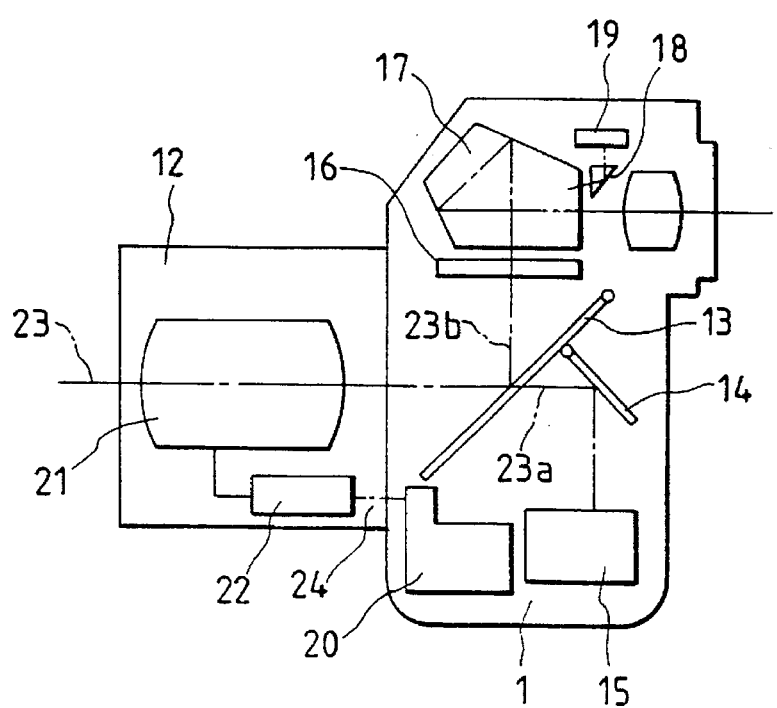
FIG. 4 is a sectional view of the camera illustrated in FIG. 1.

FIG. 4 is a sectional view of the camera body 1 mounted with a photographing lens 12.

The camera body 1 is equipped with a main mirror 13, a submirror, 14 a focus detecting device 15, a screen 16, a pentaprism 17, a prism 18, a light metering device 19 and a lens driving device 20. On the other hand, the photographing lens 12 is equipped with a driving device 22 for focus-driving a lens unit 21.

In this embodiment, the autofocus operation will be performed in the following manner.

A light beam 23 passing through the photographing lens 12 is split by a main mirror 13 serving as a partially half-mirror into a transmitted light beam 23a and a reflected light beam 23b. The transmitted light beam 23a is reflected by the submirror 14 and incident on the focus detecting device 15. The focus detecting device 15 is a known device for determining whether or not an in-focus state is present or not by dividing an exit pupil of the lens unit 21 and generating a signal corresponding thereto. This focus detecting device 15 has a photographing picture in which nine focus detection areas are two-dimensionally arranged and detects a focus adjusted state of the photographing lens 12 in every focus detection area.

Figure 5:
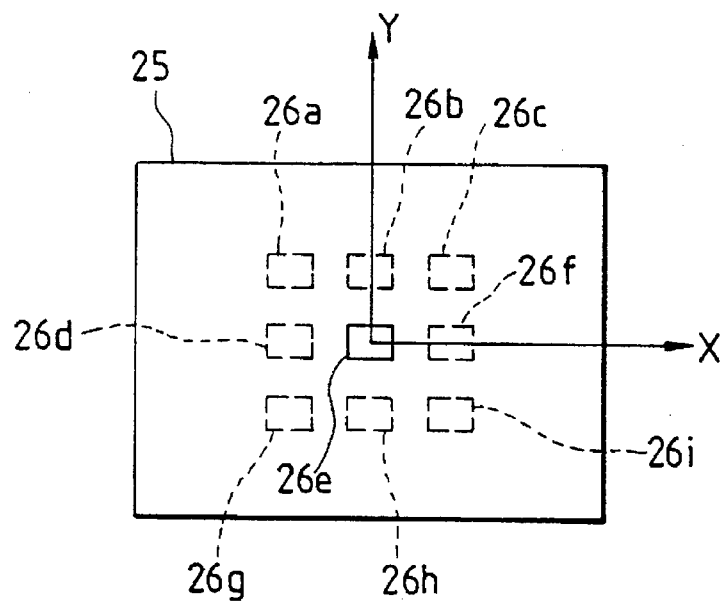
FIG. 5 is a diagram illustrating focus detection regions on a finder picture that are displayed on a finder display unit.

FIG. 5 is a diagram showing a picture 25 to be viewed through a finder.

The screen 16 is provided with a finder display unit composed of liquid crystal or the like. Among nine region mark segments 26a to 26i corresponding to nine focus detection regions of the photographing picture, a region selected as a region in which a focus is detected by a region selection button 3 is so displayed as to be overlapped with an object image on the finder picture 25.

Figure 6:
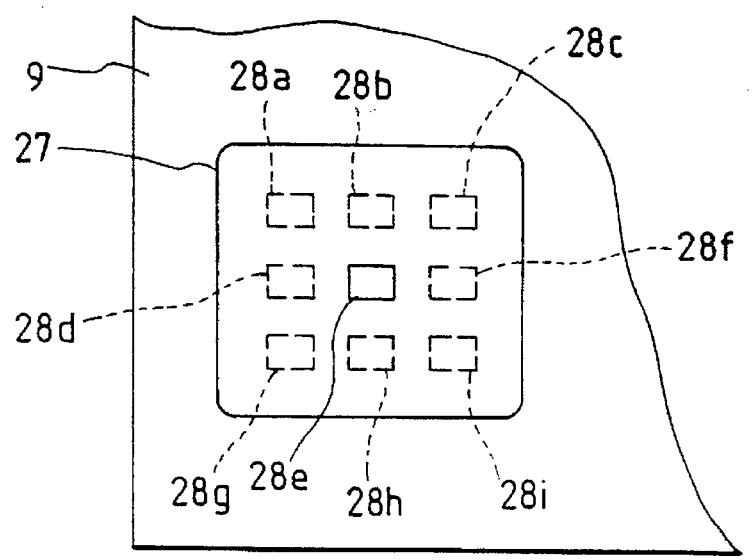
FIG. 6 is a diagram illustrating focus detection regions displayed on an external display unit.

FIG. 6 is a diagram illustrating a part of the external display unit 9.

The external display unit 9 is composed of the liquid crystal or the like. A symbol mark 27 of the photographing picture of the photographing lens 12 is displayed on the external display unit 9. Displayed, at the same time, on the external display unit 9 is a symbol mark corresponding to the region selected as a focus detection region by the region selection button 3 among nine symbol marks 28a to 28i corresponding to the nine focus detection regions on the photographing picture.

An unillustrated control device controls the lens driving device 20 (as in FIG. 4) on the basis of ah item of focus detection data given from the focus detecting device 15, thereby driving an unillustrated motor of the lens driving device 20. Motive power of the lens driving device 20 is transmitted via a power transmission device 24 to the driving device 22, and the driving device 22 in turn drives the lens unit 21, thereby performing focusing.

Further, a light metering mechanism is constructed in the manner which follows.

Referring to FIG. 4, the light beam 23b is projected to form an image on the screen 16 and further travels through the pentaprism 17 and the prism 18, thus falling on the light metering device 19. In accordance with this embodiment, light metering regions are set in the same regions as the nine focus detection regions set on the photographing picture of the photographing lens 12. The light metering device 19 detects a luminance of the object in every light metering region.

Next, the region selection button 3 will be explained in detail with reference to FIGS. 7 to 10.

Figure 7:
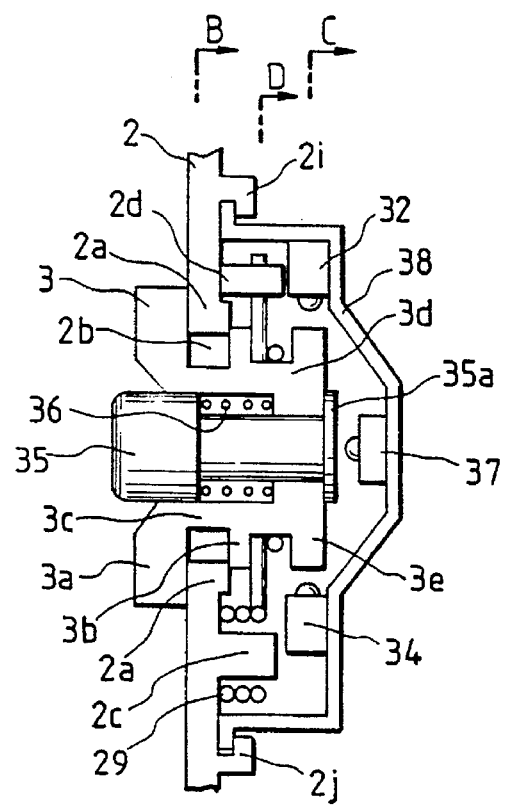
FIG. 7 is a vertical sectional view of a region selection button in a portion A shown in FIG. 1.
Figure 8:
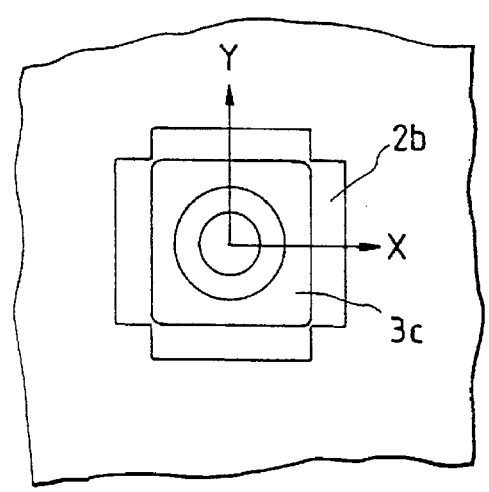
FIG. 8 is a cross-sectional view illustrating the region selection button in a portion B shown in FIG. 7.

FIG. 7 is a vertical sectional view of the region selection button 3 in a portion A shown in FIG. 1. FIG. 8 is a cross-sectional view of the region selection button 3 in a portion B shown in FIG. 7. The region selection button 3 penetrates a cross hole 2b of the rear cover 2, and a hole edge portion 2a of the rear cover 2 is sandwiched in between an operating portion 3a and a flange 3b. An angular sectional portion 3c engages with the cross hole 2b, whereby the region selection button 3 is shiftable in X- and Y-directions in FIG. 1.

Figure 9:
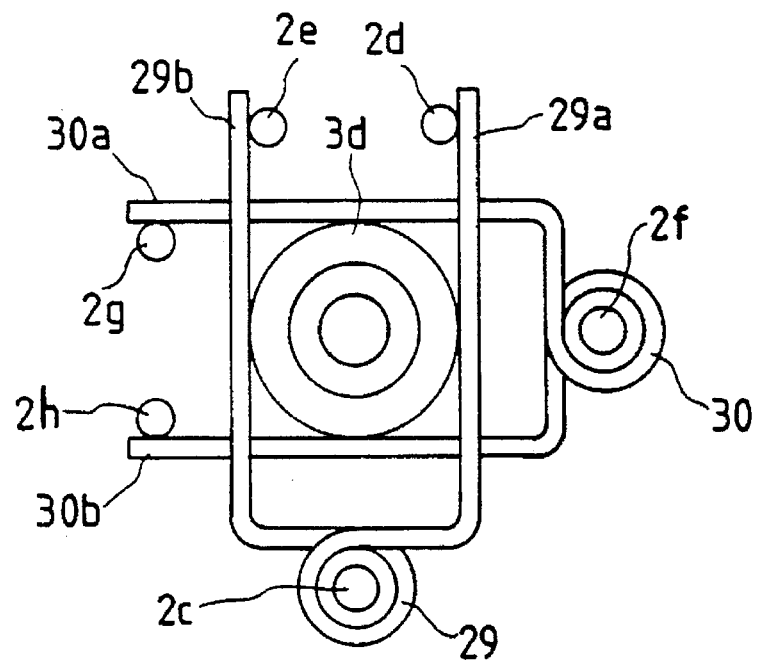
FIG. 9 is a cross-sectional view illustrating the region selection button in a portion D shown in FIG. 7.

FIG. 9 is a cross-sectional view of a portion D shown in FIG. 7. Bosses 2c, 2d, 2e, 2f, 2g, 2h are, as illustrated in FIGS. 7 and 9, are provided inwardly of the rear cover 2. A torsion spring 29 is axially supported around the boss 2c. Spring legs 29a, 29b are caught by the bosses 2d, 2e. Similarly, a torsion spring 30 is axially supported around the boss 2f, and spring legs 30a, 30b are caught by the bosses 2g, 2h. The spring legs 29a, 29b, 30a, 30b are so located as to surround a circular sectional portion 3d of the region selection button 3, and some gaps are formed therebetween.

Figure 10:
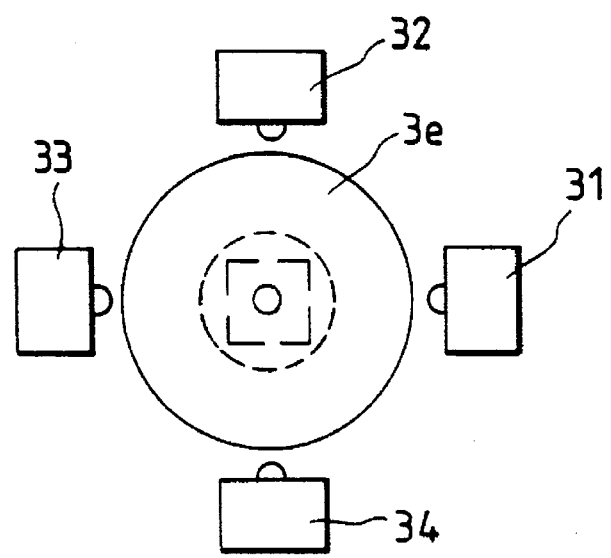
FIG. 10 is a cross-sectional view illustrating the region selection button in a portion C shown in FIG. 7.

FIG. 10 is a cross-sectional view of a portion C shown in FIG. 7. A right edge portion 3e of the region selection button 3 takes a circular shape. As illustrated in FIG. 10, switches 31, 32, 33, 34 are arranged at an interval of 90° in close proximity to the edge surface thereof. These switches 31 to 34 are turned ON when pushing an actuator but turned OFF when separated therefrom.

Further, as illustrated in FIG. 7, a button member 35 is so axially supported as to be shiftable in the axial direction but coaxial with the region selection button 3. The button member 35 is biased leftward in the Figure by a spring 36. A switch 37 is provided in the vicinity of a right edge portion 36a of this button member 35. The switch 37 is also turned ON when pushing the actuator but turned OFF when separated therefrom. A cover member 38 supports the switches 31 to 34 and 37. The cover member 38 engages with key portions 2i, 2j provided inwardly of the rear cover and is thus fixed thereto.

FIGS. 7 to 10 illustrate a state where the region selection button 3 is not manipulated. As depicted in FIG. 1, when depressing the region selection button 3 in the X-direction, as illustrated in FIG. 8, the region selection button 3 is moved in the +X direction while being guided along the cross hole 2b, thereby turning ON the switch 31 shown in FIG. 10. At this time, it follows that the spring leg 29a is pushed, and the region selection button 3 is biased by the spring leg 29a in a return direction. Hence, when stopping the depressing operation of the region selection button 3, the region selection button 3 is returned to the original position. The procedures are the same when operated in X, +Y and −Y directions. The switches 33, 32, 34 in the respective directions are turned ON each time the operation is performed. Further, when canceling the operation, the region selection button 3 is returned to the original position by biasing forces of the springs 29, 30.

When depressing the button member 35, the switch 37 is turned ON. When stopping the depression, the button member 35 is returned to the original position while being biased by the spring 36, and, at the same time, the switch 37 is turned OFF.

Figure 11:
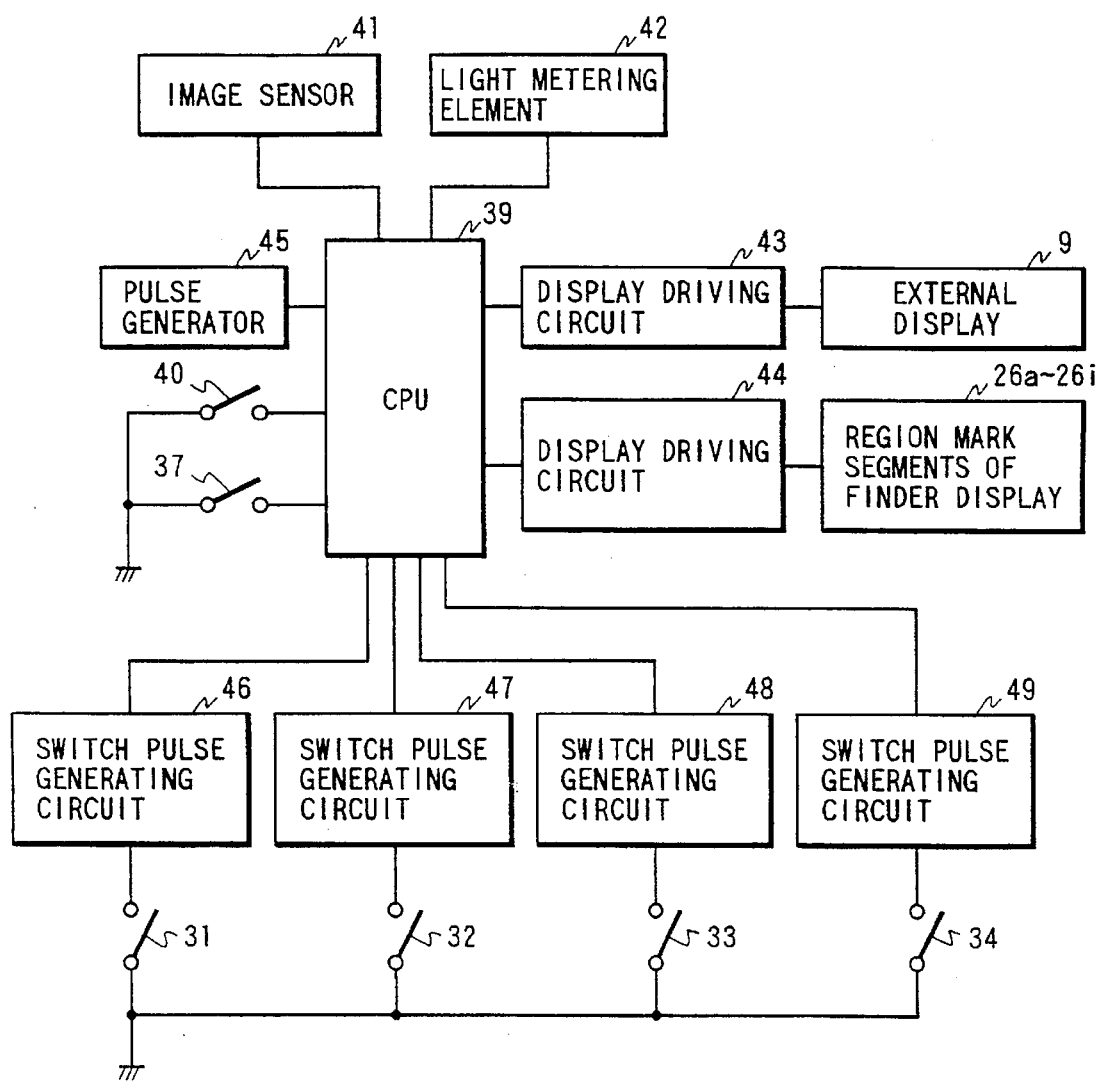
FIG. 11 is a functional block diagram of a construction according to the first embodiment.

FIG. 11 is a functional block diagram of a configuration according to the first embodiment.

Connected to a CPU 39 are the switch 37 turned ON/OFF interlocking with the button member 35, a mode switch 40 turned ON/OFF interlocking with the mode switching lever 11, an image sensor 41 of the focus detecting device 15 and a light metering element of the light metering device 19. Connected further to the CPU 39 are a display unit driving circuit 43 for driving the external display unit 9, a display unit driving circuit 44 for driving the region mark segments 26a to 26i of the finder display unit, a pulse generator 45 for generating pulses interlocking with the data setting dial 8 and switch pulse generating circuits 46 to 49 for respectively generating switch pulses interlocking with the switches 31 to 34.

The operation of the embodiment will be explained with reference to flowcharts of FIGS. 12 to 14.

Figure 12:
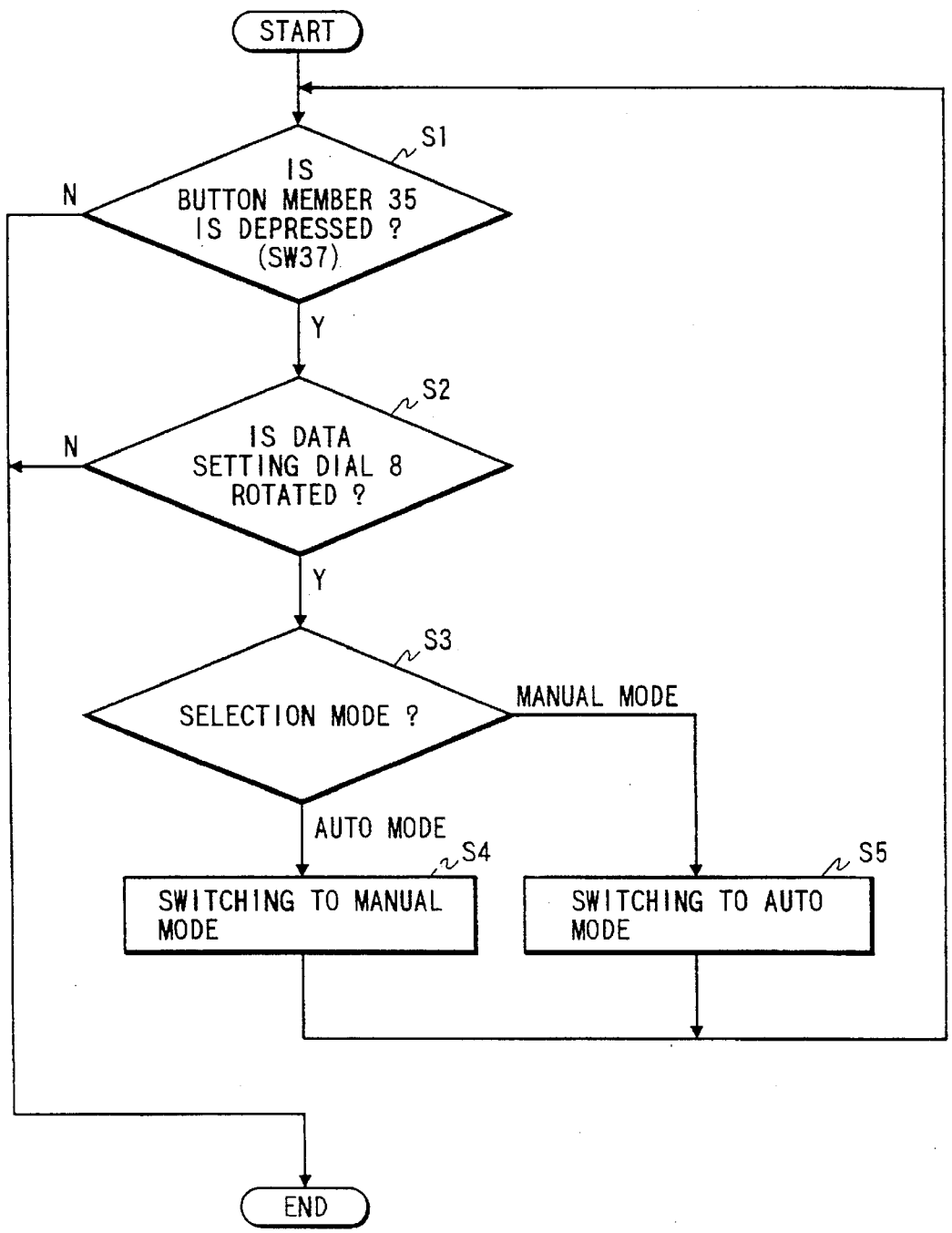
FIG. 12 is a flowchart showing a processing routine for setting a selection mode of the focus detection region.

FIG. 12 illustrates a control routine for setting selection modes of the focus detection regions. Herein, the selection modes are modes of selecting the focus detection regions. In a manual mode, the focus detection region is selected by a manual operation. While in an auto mode, the focus detection region is automatically selected by the camera. Note that there is, e.g., a method of selecting a result of the focus detection which indicates the closest focusing among results of the focus detection in the nine focus detection regions in terms of a region selection algorithm in the auto mode. The auto mode and the manual mode are switched over by rotationally manipulating the data setting dial 8 while depressing the button member 35. That is, the manual mode and the auto mode are alternately switched over with every unit rotation of the data setting dial 8.

In step S1, there is determined whether or not the button member 35 is depressed through the switch 37. If depressed, the processing proceeds to step S2. Whereas if not depressed, the processing comes to an end. In step S2, there is determined whether or not the data setting dial 8 is rotated from a generation or non-generation of the pulses by the pulse generator 45. If the data setting dial 8 is rotated, the processing moves to step S3. Whereas if not, the processing is finished. When the button member 35 is depressed, and when the data setting dial 8 is rotated, the selection mode is determined in step S3. If the auto mode is set at the present time, the processing goes to step S4, wherein the mode is switched over to the manual mode. If the manual mode is set at the present time, the processing goes to step S5, wherein the mode is switched over to the auto mode. If the auto mode is selected, all the region mark segments 26a to 26i of the finder display unit of the screen 16 shown in FIG. 5 and all the symbol marks 28a to 28i of the external display unit 9 are lift up.

Figure 13:
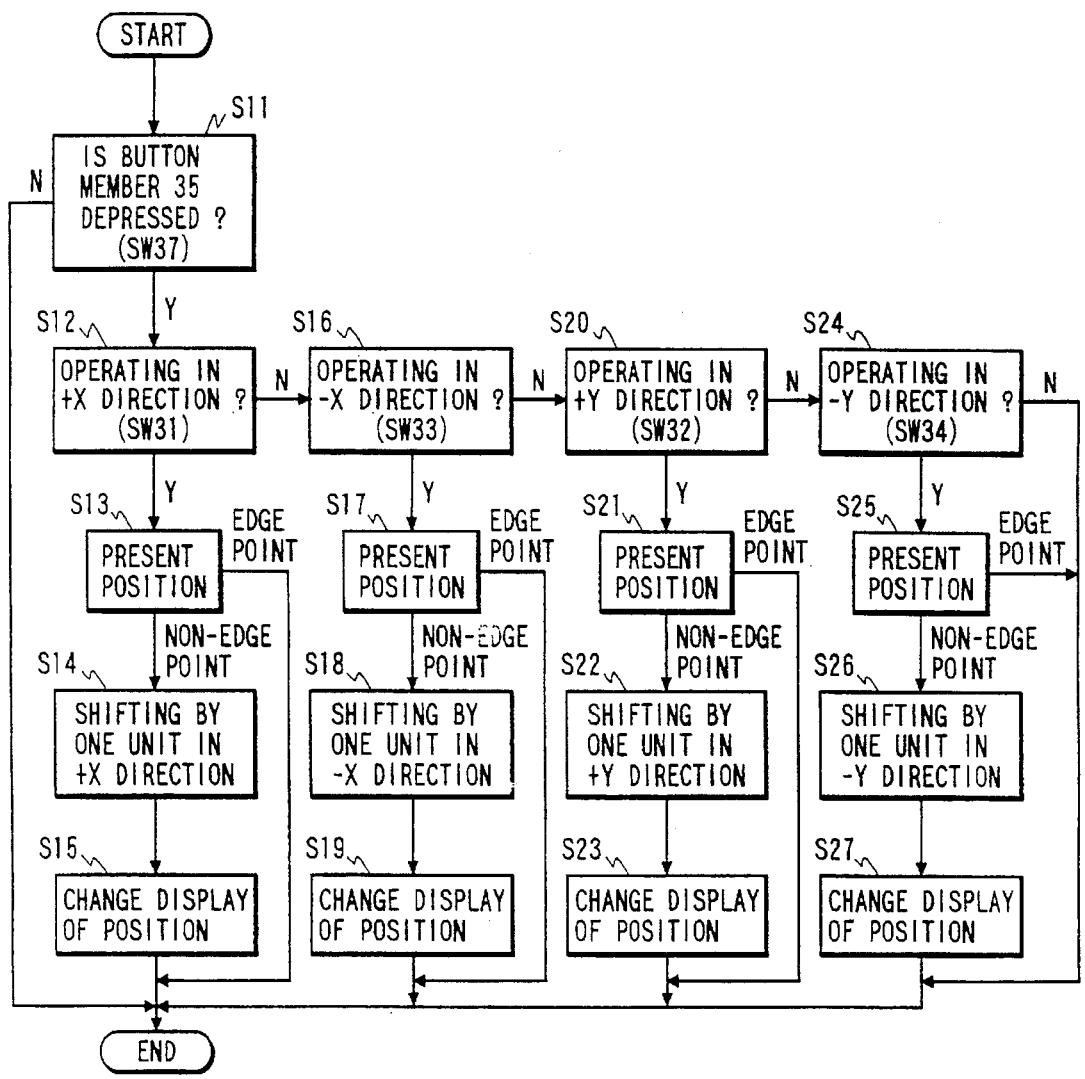
FIG. 13 is a flowchart showing a selection processing routine of the focus detection region in a manual selection mode.

FIG. 13 shows a selection processing routine of the focus detection regions in the manual selection mode. The focus detection region is selected by shifting the region selection button 3 in a direction of the focus detection region to be changed over while depressing the button member 35.

In step S11, there is determined whether or not the button member 35 is depressed through the switch 37. If the button member 35 is depressed, the processing proceeds to step S12. Whereas if not, the processing comes to an end. In step S12, there is determined whether or not the region selection button 3 is operated in the +X direction through the switch 31. If operated in the +X direction, the processing goes to step S13. Whereas if not, the processing moves to step S16. In step S13, the present position of the focus detection region is determined. If the present selection region is conceived as a region (26c or 26f or 26i) at the edge point in the +X direction, the processing is finished. Whereas if not the region at the edge point, the processing proceeds to step S14. In step S14, the selection region is shifted by one unit in the +X direction, thus changing the selection region. For instance, if the present selection region is 26e, the region moves to 26f. Next in step S15, up the display segment on the finder display unit that corresponds the newly selected focus detection region and the symbol mark on the external display unit 9 are lit up.

In step S16, there is determined whether or not the region selection button 3 is operated in the −X direction through the switch 33. If operated in the −X direction, the processing proceeds to step S17. Whereas if not, the processing proceeds to step S20. In step S17, the present position of the focus detection region is determined. If the present selection region is a region (26a or 26d or 26g) at the edge point in the −X direction, the processing is finished. Whereas if not the region at the edge point, the processing proceeds to step S18. In step S18, the selection region is shifted by one unit in the −X direction, thus changing the selection region. For example, if the present selection region is 26e, the region moves to 26d. Next in step S19, the display segment on the finder display unit that corresponds the newly selected focus detection region and the symbol mark on the external display unit 9 are lit up.

In step S20, there is determined whether or not the region selection button 3 is operated in the +Y direction through the switch 32. If operated in the +Y direction, the processing proceeds to Step S21. Whereas if not, the processing In step S21, the S21. In step S21, the present position of the focus detection region is determined. If the present selection region is a region (26a or 26b or 26c) at the edge point in the +Y direction, the processing is finished. Whereas if not the region at the edge point, the processing proceeds to step S22.

In step S22, the selection region is shifted by one unit in the +Y direction, thus changing the selection region. For instance, if the present selection region is 26e, the region moves to 26b. Next in step S23, the display segment on the finder display unit that corresponds the newly selected focus detection region and the symbol mark on the external display unit 9 are lit up.

In step S24, there is determined whether or not the region selection button 3 is operated in the −Y direction through the switch. 34. If operated in the −Y direction, the processing proceeds to step S25. Whereas if not, the processing comes to an end. In step S25, the present position of the focus detection region is determined. If the present selection region is a region (26g or 26h or 26i) at the edge point in the −Y direction, the processing is finished. Whereas if not the region at the edge point, the processing proceeds to step S26. In step S26, the selection region is shifted by one unit in the −Y direction, thus changing the selection region. For example, if the present selection region is 26e, the region moves to 26h. Next in step S27, the display segment on the finder display unit that corresponds the newly selected focus detection region and the symbol mark on the external display unit 9 are lit up.

Figure 14:
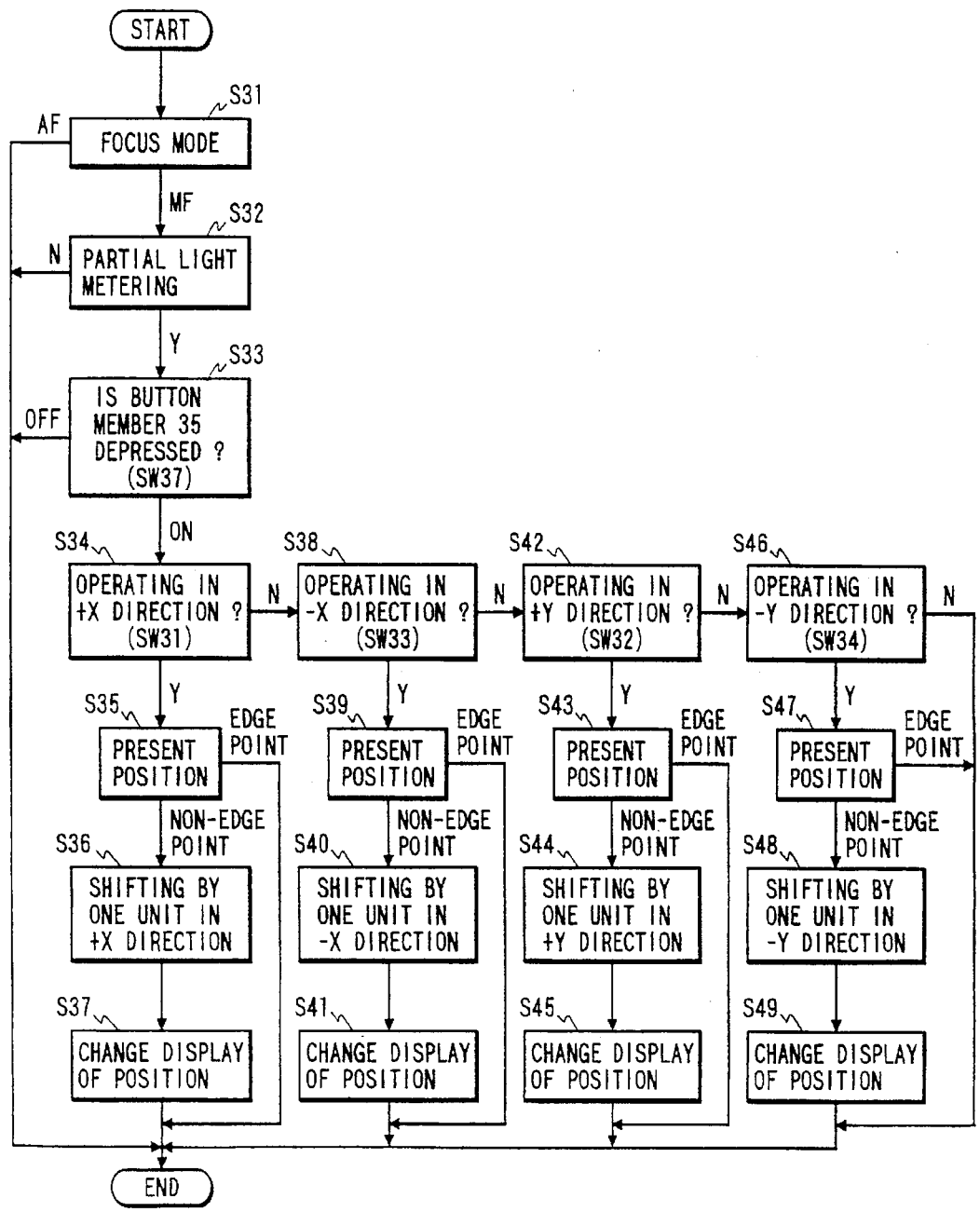
FIG. 14 is a flowchart showing a selection processing routine of a light metering region in a partial light metering mode.

FIG. 14 shows a selection processing routine of the light metering regions in the partial light metering mode. In the partial light metering mode, the light metering region is selected by the region selection button 3, and the selected region is displayed on the finder display unit of the screen 16 and on the external display unit 9. The light metering region is selected by shifting the region selection button 3 in a direction of the light metering region to be switched over while depressing the button member 35.

In step S31, the focus mode is determined through the mode switch 40. If determined as the manual focus mode, the processing proceeds to step S32. If determined as the autofocus mode, the processing comes to an end. When in the manual focus mode, the light metering mode is determined in step S32. If determined as the partial light metering mode, the processing proceeds to step S33. Whereas if not, the processing is finished. When the manual focus mode is selected, and when the partial light metering mode is selected, there is determined whether or not the button member 35 is depressed through the switch 37 in step S33. If the button member 35 is depressed, the processing proceeds to step S34. Whereas if not depressed, the processing is finished.

In step S34, there is determined whether or not the region selection button 3 is operated in the +X direction through the switch 31. If operated in the +X direction, the processing proceeds to step S35. Whereas if not, the processing proceeds to step S38. In step S35, the present position of the focus detection region is determined. If the present selection region is a region (26c or 26f or 26i) at the edge point in the +X direction, the processing is finished. Whereas if not the region at the edge point, the processing proceeds to step S36. In step S36, the selection region is shifted by one unit in the +X direction, thus changing the selection region. For example, if the present selection region is 26e, the region moves to 26f. Next in step S37, the display segment on the finder display unit that corresponds the newly selected focus detection region and the symbol mark on the external display unit 9 are lit up.

In step S38, there is determined whether or not the region selection button 3 is operated in the −X direction through the switch 33. If operated in the −X direction, the processing proceeds to step S39. Whereas if not, the processing proceeds to step S42. In step S39, the present position of the focus detection region is determined. If the present selection region is a region (26a or 26d or 26g) at the edge point in the −X direction, the processing is finished. Whereas if not the region at the edge point, the processing proceeds to step S40. In step S40, the selection region is shifted by one unit in the −X direction, thus changing the selection region. For instance, if the present selection region is 26e, the region moves to 26d. Next in step S41, the display segment on the finder display unit that corresponds the newly selected focus detection region and the symbol mark on the external display unit 9 are lit up.

In step S42, there is determined whether or not the region selection button 3 is operated in the +Y direction through the switch 32. If operated in the +Y direction, the processing proceeds to step S43. Whereas if not, the processing proceeds to step S46. In step S43, the present position of the focus detection region is determined. If the present selection region is a region (26a or 26b or 26c) at the edge point in the +Y direction, the processing is finished. Whereas if not the region at the edge point, the processing proceeds to step S44. In step S44, the selection region is shifted by one unit in the +Y direction, thus changing the selection region. For example, if the present selection region is 26e, the region moves to 26b. Next in step S45, the display segment on the finder display unit that corresponds the newly selected focus detection region and the symbol mark on the external display unit 9 are lit up.

In step S46, there is determined whether or not the region selection button 3 is operated in the −Y direction through the switch 34. If operated in the −Y direction, the processing proceeds to step S47. Whereas if not, the processing comes to an end. In step S47, the present position of the focus detection region is determined. If the present selection region is a region (26g or 26h or 26i) at the edge point in the −Y direction, the processing is finished. Whereas if not the region at the edge point, the processing proceeds to step S48. In step S48, the selection region is shifted by one unit in the −Y direction, thus changing the selection region. For example, if the present selection region is 26e, the region moves to 26h. Next in step S49, the display segment on the finder display unit that corresponds the newly selected focus detection region and the symbol mark on the external display unit 9 are lit up.

Note that the one-unit focus detection region is moved per operation, with the region selection button serving as the region selection member, in the above-discussed first embodiment. However, the selection region may be continuously moved when continuing to operate the region selection button 3.

Further, in place of the region selection button 3 shifting on the plane orthogonal to the optical axis of the photographing lens, a track ball may be provided on the rear surface of the camera. If constructed in this way, and when there are prepared a large number of focus detection regions, the operability is further enhanced.

Moreover, in the embodiment discussed above, the explanation has been given by exemplifying the region selection button 3 having the operation surface substantially parallel to the finder picture. However, switches may be provided on the surface substantially parallel to the finder picture in four directions, i.e. in the up-and-down and right-and-left directions. The selection region may be switched over in the direction corresponding to the operated switch.

Second Embodiment

Figure 15:
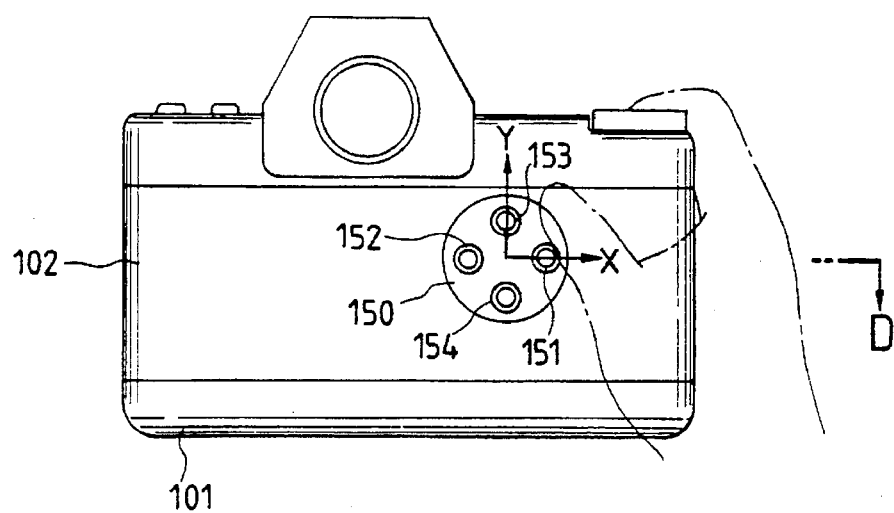
FIG. 15 is a rear view of a camera in a second preferred embodiment according to the present invention.
Figure 16:
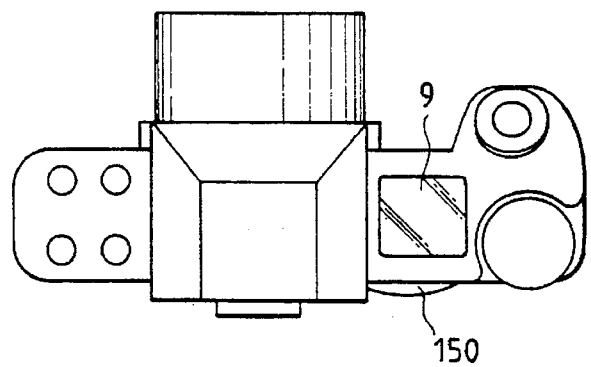
FIG. 16 is a top view of the camera shown in FIG. 15.

FIGS. 15 and 16 are views (a rear view and a top view) each illustrating an external appearance of the camera in a second preferred embodiment according to the present invention. A rear cover 102 is provided with a cover member 150 and push buttons 151, 152, 153, 154 for selecting the focus detection regions (which will hereinafter be mentioned in detail). As in the same way with the first embodiment, the moving directions of the focus detection regions are indicated by the X and Y direction in the following discussion. In this embodiment, the elements exclusive of a focus detection region selection operating unit constructed of the cover member 150 and the push buttons 151, 152, 153, 154 are the same as those in the first embodiment.

Figure 17:
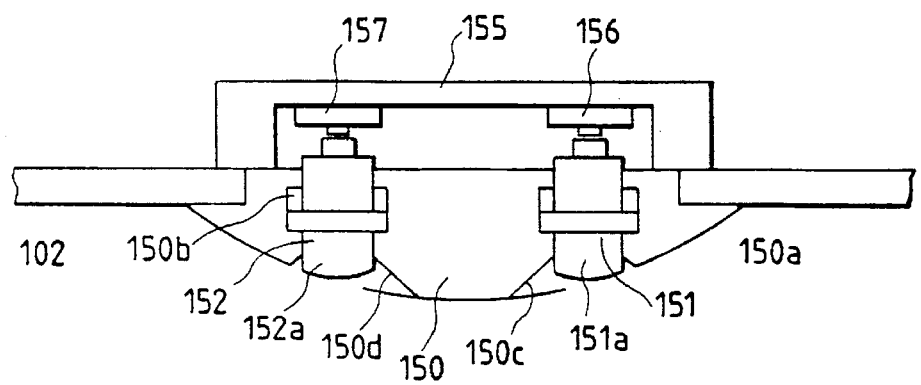
FIG. 17 is a view illustrating a horizontal section D of the camera shown in FIG. 15.

The cover member 150 and the push buttons 151, 152, 153, 154 are provided in such positions as to be manipulated by a thumb (indicated by one-dotted line) when holding the camera body 101. FIG. 17 illustrates a horizontal section D in FIG. 15. The cover member 150 assumes a substantially spherical shape, and the push buttons 151, 152 are held in holes 150a, 150b so that the buttons can be pushed. Switches 156, 157 are so attached to a base plate 155 as to be disposed on axes of the push buttons 151, 152. The cover member 150 is formed with recesses 150c, 150d around the external edge portions 151a, 152a of the push buttons 151, 152. The buttons are located slightly more inward than the outline of the cover member 150. Switches 156, 157 are switched from an OFF-state to an ON-state interlocking with the pushing operations of the push buttons 151, 152. When canceling the pushing operations, the switches returned from ON to OFF. Similarly, unillustrated switches 158, 159 are changed over from OFF to ON interlocking with the manipulations of the push buttons 152, 153 but are, when canceling the pushing operations, returned from ON to OFF.

Figure 18:
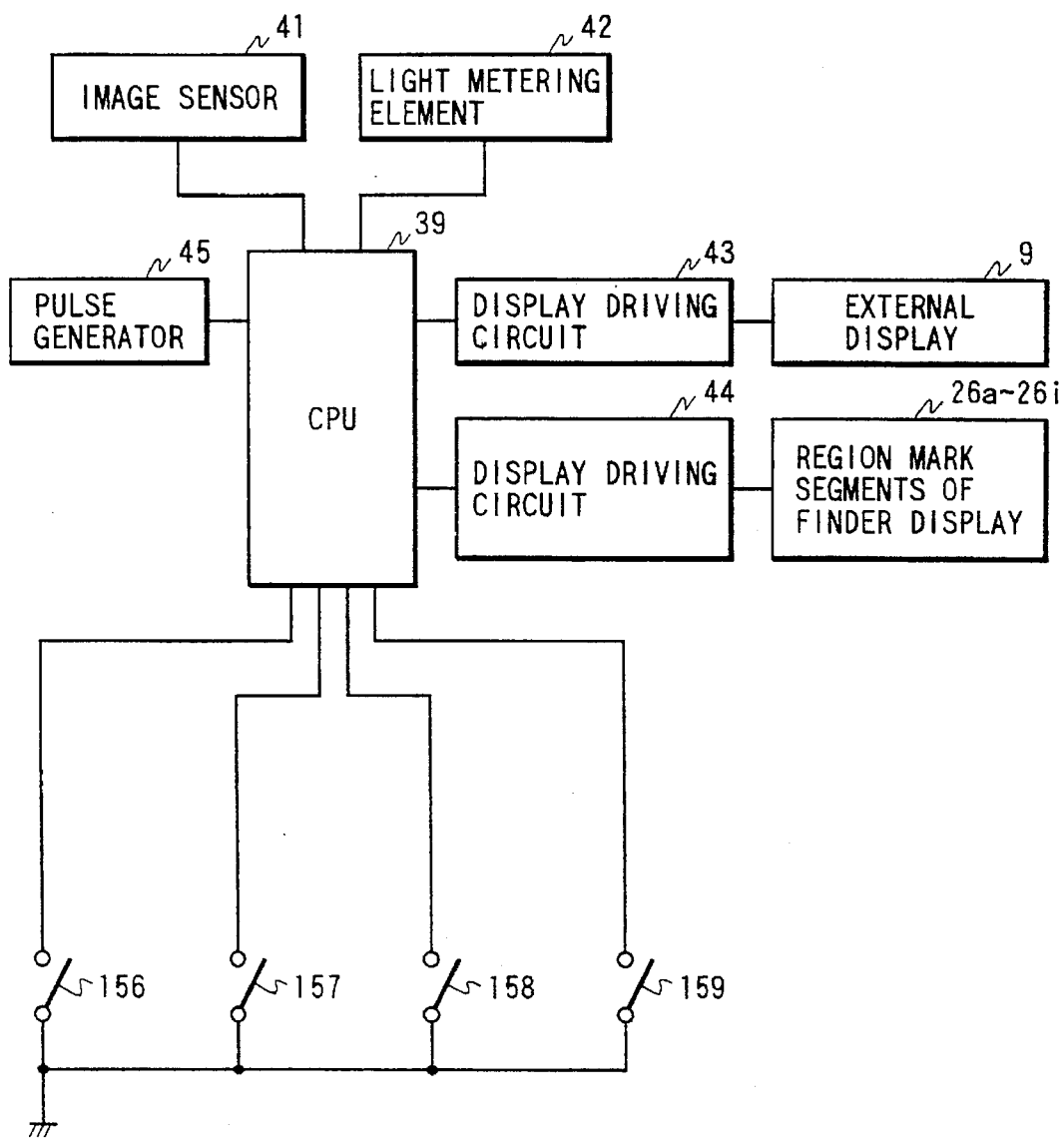
FIG. 18 is a functional block diagram of a construction according to the second embodiment.

FIG. 18 is a block diagram of a configuration of the elements relative to the control according to the second embodiment.

Connected to the CPU 39 are a focus detection element 41, a light metering element 42, a display unit driving unit 43, a screen display driving unit 44, a pulse generating unit 45 and switches 156, 157, 158, 159. These elements are the same as those in the first embodiment and marked with the like numerals in FIG. 11.

Figure 19:
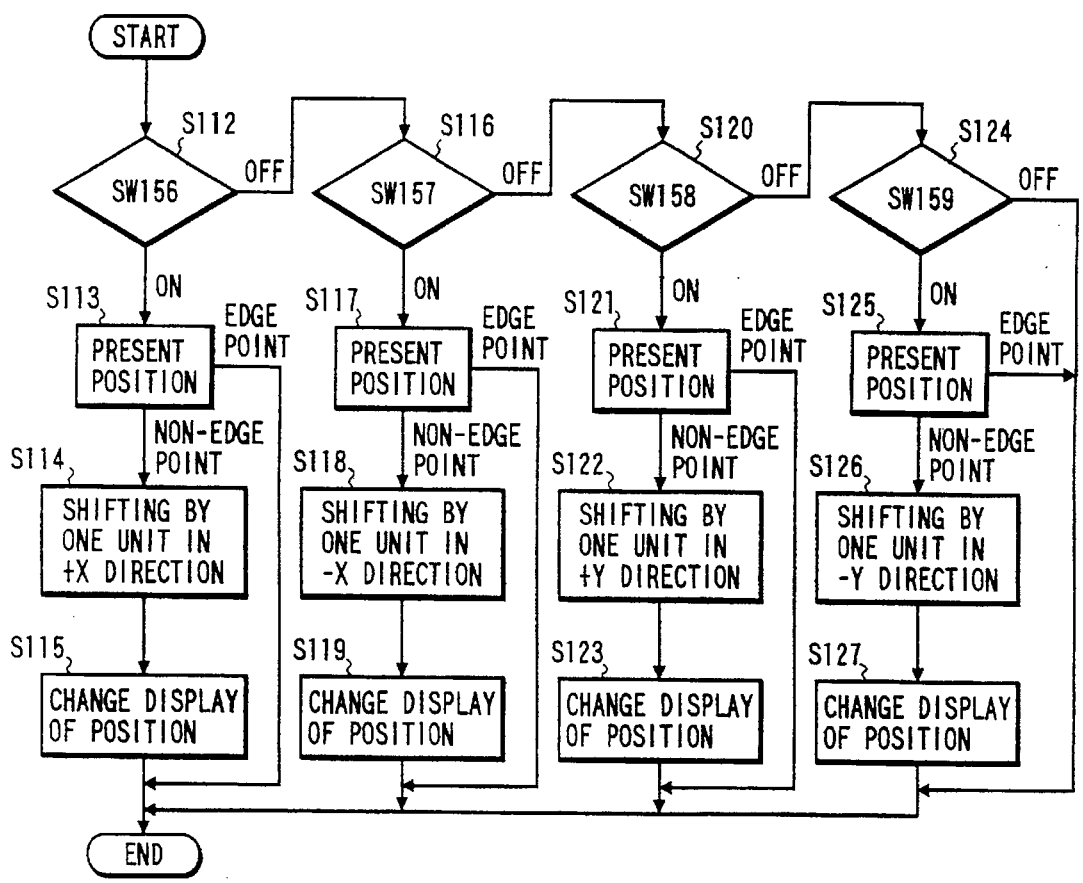
FIG. 19 is a flowchart of a control routine for selecting a focus detection region.

FIG. 19 is a flowchart showing a control routine for selecting the focus detection regions.

The selection thereof is performed by manipulating one of the push buttons 151, 152, 153, 154 illustrated in FIG. 15. Note that the displays on the picture are also the same as those in the first embodiment, and hence FIG. 5 is used unchanged for the explanation.

In step S112, a state of the switch 156 is determined. The processing goes, if in the ON-state, to step S113 but is, if in the OFF-state, diverted to step S116. In step S113, the present position (26a to 26i within the picture in FIG. 5) of the focus detection region is determined. If a position exclusive of an X-directional edge point (26c or 26f or 26i) is selected, the processing proceeds to step S114.

If the edge point is selected, the processing comes an end. In step S114, the focus detection region is shifted by one unit in the +X direction (if 26e is selected, the region is changed to 26f). In step S115, the changed focus detection region is displayed (26f is displayed) by the display unit of the screen 16. Simultaneously, a symbol mark 28f corresponding to the selected focus detection region is displayed on the external display unit 9. The step is ended with this.

In step S116, a state of the switch 157 is determined. The processing goes, if in the ON-state, to step S117 but is, if in the OFF-state, diverted to step S120. In step S117, the present position of the focus detection region is determined.

If a position exclusive of a X directional edge point (26a or 26d or 26g) is selected, the processing proceeds to step S118. If the edge point is selected, the processing comes an end. In step S118, the focus detection region is shifted by one unit in the −X direction (if 26e is selected, the region is changed to 26d). In step S119, the changed focus detection region is displayed (26d is displayed) by the display unit of the screen 16. Simultaneously, a symbol mark 28d corresponding to the selected focus detection region is displayed on the external display unit 9. The step is ended with this.

In step S120, a state of the switch 158 is determined. The processing goes, if in the ON-state, to step S121 but is, if in the OFF-state, diverted to step S124. In step S121, the present position of the focus detection region is determined. If a position exclusive of a +Y directional edge point (26a or 26b or 26c) is selected, the processing proceeds to step S122. If the edge point is selected, the processing comes an end. In step S122, the focus detection region is shifted by one unit in the +Y direction (if 26e is selected, the region is changed to 26b). In step S123, the changed focus detection region is displayed (26b is displayed) by the display unit of the screen 16. Simultaneously, a symbol mark 28b corresponding to the selected focus detection region is displayed on the external display unit 9. The step is ended with this.

In step S124, a state of the switch 159 is determined. The processing goes, if in the ON-state, to step S125 but is, if in the OFF-state, finished. In step S125, the present position of the focus detection region is determined. If a position exclusive of a Y directional edge point (26g or 26h or 26i) is selected, the processing proceeds to step S126. If the edge point is selected, the processing comes an end. In step S126, the focus detection region is shifted by one unit in the −Y direction (if 26e is selected, the region is changed to 26h). In step S127, the changed focus detection region is displayed (26h is displayed) by the display unit of the screen 16. Simultaneously, a symbol mark 28h corresponding to the selected focus detection region is displayed on the external display unit 9. The step is ended with this.

The thus controlled and selected focus detection regions are indicated by the symbol marks 28a to 28i on the display unit 9.

Third Embodiment

Figure 20:
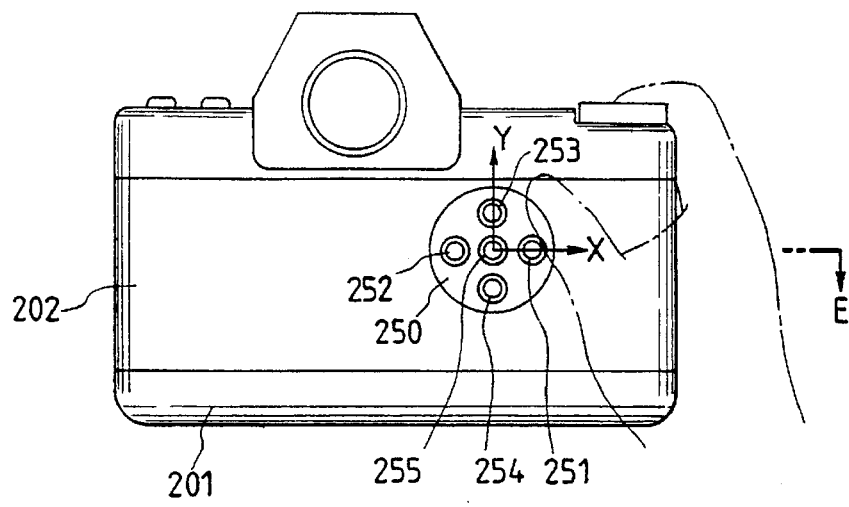
FIG. 20 is a rear view of a camera in a third preferred embodiment according to the present invention.
Figure 21:
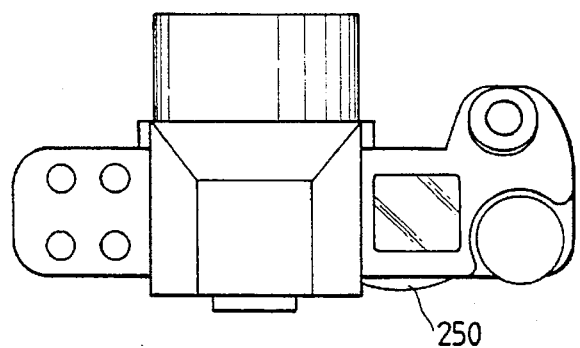
FIG. 21 is a top view of the camera shown in FIG. 20.
Figure 22:
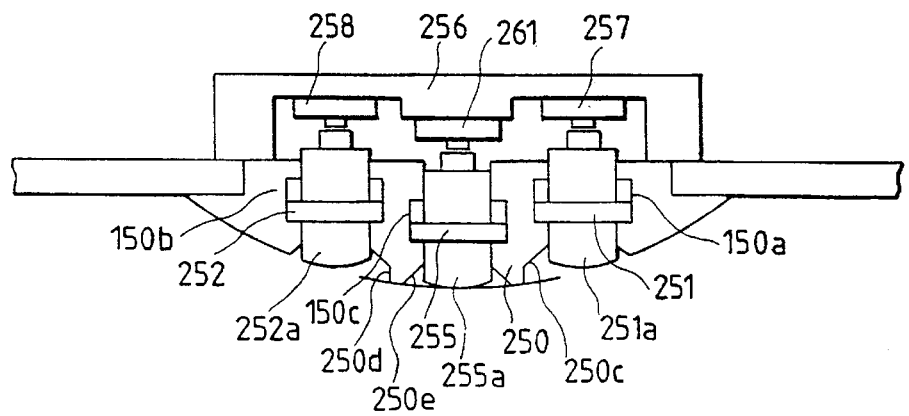
FIG. 22 is a view illustrating a horizontal section E of the camera shown in FIG. 20.

FIGS. 20 and 21 are views (a rear view and a top view) each illustrating an external appearance of the camera in a third preferred embodiment according to the present invention. In this embodiment, five pieces of focus detection regions are prepared (26b, 26d, 26e, 26f, 26h in FIG. 5). A rear cover 202 is provided with a cover member 250 and push buttons 251, 252, 253, 254 for selecting the focus detection regions (which will hereinafter be mentioned in detail). In this embodiment, the elements exclusive of a focus detection region selection operating unit constructed of the cover member 250 and the push buttons 251, 252, 253, 254 are the same as those in the first embodiment. The cover member 150 and the push buttons 251, 252, 253, 254 are provided in such positions as to be manipulated by the thumb (indicated by one-dotted line) when holding a camera body 201. FIG. 22 illustrates a horizontal section E in FIG. 20. The cover member 250 takes a substantially spherical shape, and the push buttons 251, 252, 255 are held in holes 250a, 250b, 250c so that the buttons can be pushed. Switches 257, 258, 261 are so attached to a base plate 256 as to be disposed on axes of the push buttons 251, 252, 255. The cover member 250 is formed with recesses 250c, 250d, 250e around the external edge portions 251a, 252a, 255a of the push buttons 251, 252, 255. The buttons are located slightly more inward than the outline of the cover member 250. Switches 257, 258, 261 are switched from an OFF-state to an ON-state interlocking with the pushing operations of the push buttons 251, 252, 255. When canceling the pushing operations, the switches returned from ON to OFF. Similarly, unillustrated switches 259, 260 are changed over from OFF to ON interlocking with the manipulations of the push buttons 253, 254 but are, when canceling the pushing operations, returned from ON to OFF.

Figure 23:
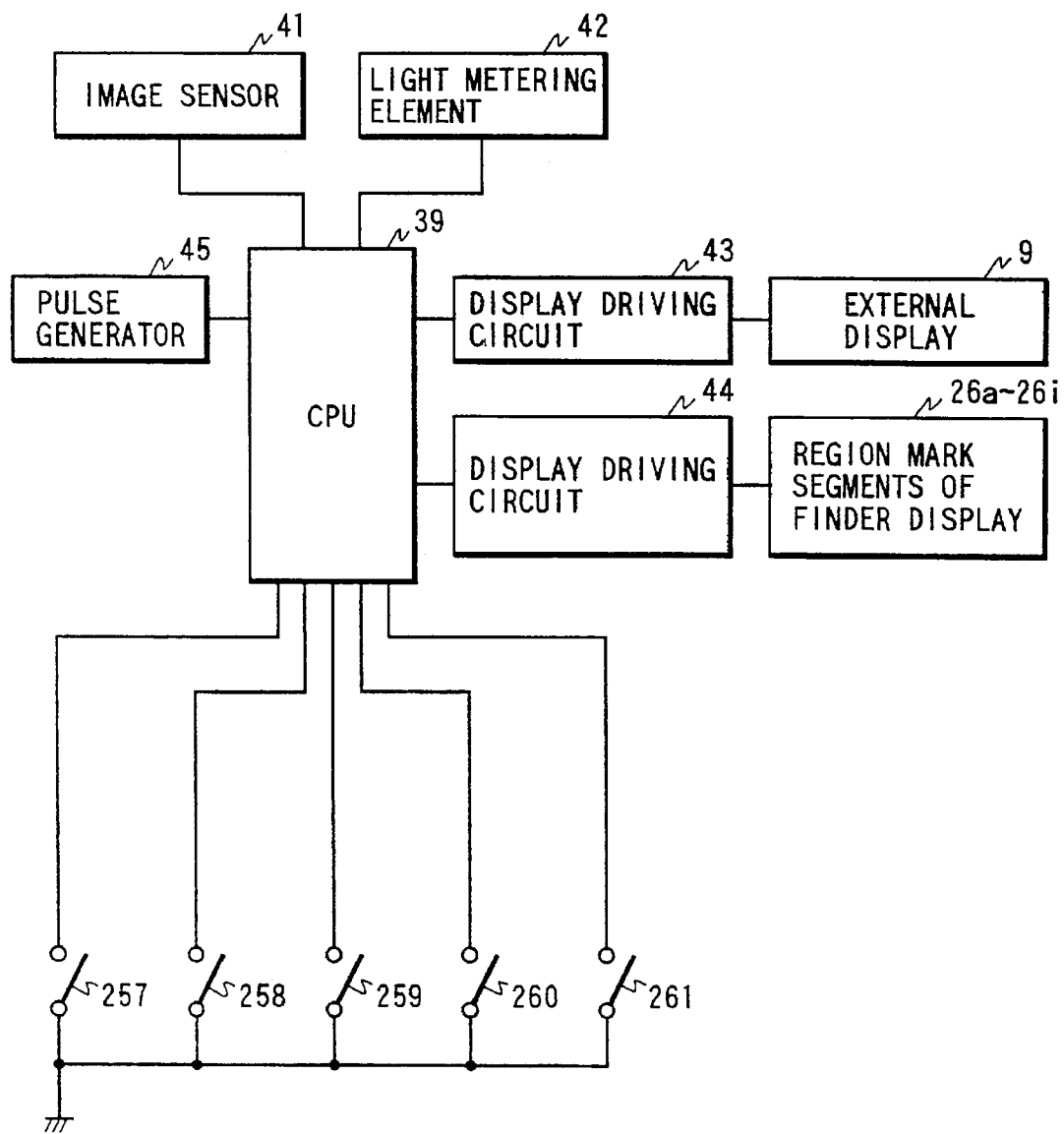
FIG. 23 is a functional block diagram of a construction according to the third embodiment.

FIG. 23 is a block diagram of a configuration of the elements relative to the control according to the third embodiment.

Connected to the CPU 39 are the focus detection element 41, the light metering element 42, the display unit driving unit 43, the screen display driving unit 44, the pulse generating unit 45 and switches 257, 259, 260, 261. These elements are the same as those in the first embodiment and marked with the like numerals in FIG. 11.

The push buttons 251, 252, 253, 254, 255 in FIG. 20 correspond to the focus detection regions 26f, 26d, 26b, 26h, 26e in FIG. 5 and further correspond to the symbol marks 28f, 28d, 28b, 28h, 28e in FIG. 6. That is, when the switch 257 is turned ON by pushing the push button 251, the focus detection region 26f among the regions in FIG. 5 is selected. Then, the symbol mark 28f is displayed on the external display unit 9 in FIG. 6. Similarly when pushing other push button, a focus detection region corresponding to a position of the push button is selected, and a symbol mark corresponding thereto is displayed.

In the first embodiment, the manipulation member is of the slide type. In accordance with the second embodiment, however, the manipulation member is of the push button type. The region is relatively shifted in the second embodiment, and this exhibits substantially the same effect as that in the first embodiment. In contrast with this, the third embodiment adopts the push button type, and each button shows a one-to-one correspondence with respect to the individual focus detection region. Hence, the manipulation is intuitively perceived in terms of sense, and a much higher operability is exhibited.

The installation of the region selection member is not confined to the above-mentioned in the embodiment discussed above. For instance, there may be selected, e.g., the rear surface of the upper cover of the camera, more specifically, an optimum position on the rear surface in accordance with a size and a configuration of the camera.

The focus detection regions are previously made corresponding to the light metering regions, and, when the focus detection region is selected by the region selection button, the corresponding light metering region may be automatically selected. When the light metering region is selected by the region selection button, the corresponding focus detection region may be automatically selected.

Based on the construction in the embodiment discussed above, the region selection button 3 and the push buttons 151 to 154 and 251 to 254 correspond to region selection members. The focus detection unit 15 corresponds to a focus detection element, and the finder display unit corresponds to a display element. The data setting dial 8 corresponds to a focus adjusting mode selection member. The CPU 39 corresponds to a focus adjusting mode setting means, and the light metering unit 19 corresponds to a light metering element.

Fourth Embodiment

Figure 24:
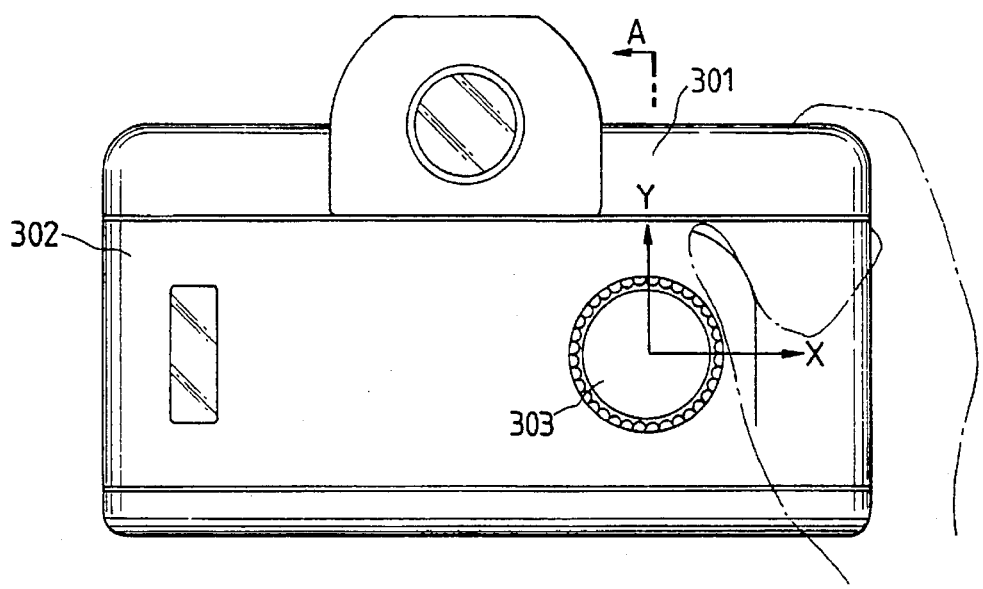
FIG. 24 is a rear view of a camera in a fourth preferred embodiment according to the present invention.

FIG. 24 is a rear view illustrating a camera in a fourth preferred embodiment according to the present invention.

A rear cover 302 of a camera body 301 is provided with a data setting dial 303 shiftable on the surface substantially parallel to the finder picture. The data setting dial 303 is provided in such a position as to be manipulatable by a thumb (indicated by one-dotted line) when holding the camera body 301. A shifting direction of this data setting dial 303 is detected, thus selecting a region corresponding to the shifting direction. Further, this data setting dial 303 is connected to an unillustrated pulse generator and inputs various items of data of the camera by causing the pulse generator to generate pulses corresponding to rotating operations. The pulse generator generates a unit pulse per unit rotation of the data setting dial 303 regulated by a click stop.

The details of the data setting dial 303 will be explained with reference to FIGS. 25 to 29.

Figure 25:
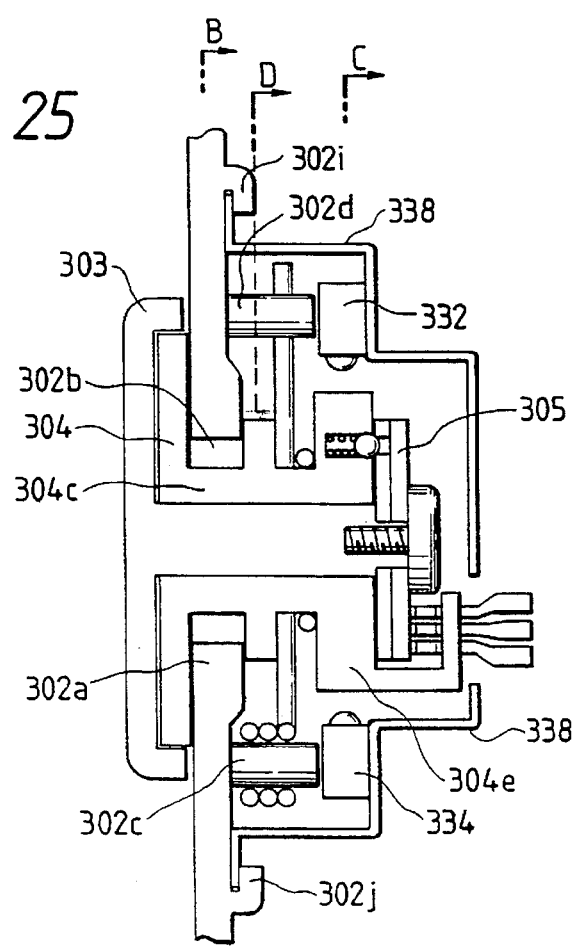
FIG. 25 is a vertical sectional view of a data setting dial in a portion A of FIG. 24.
Figure 26:
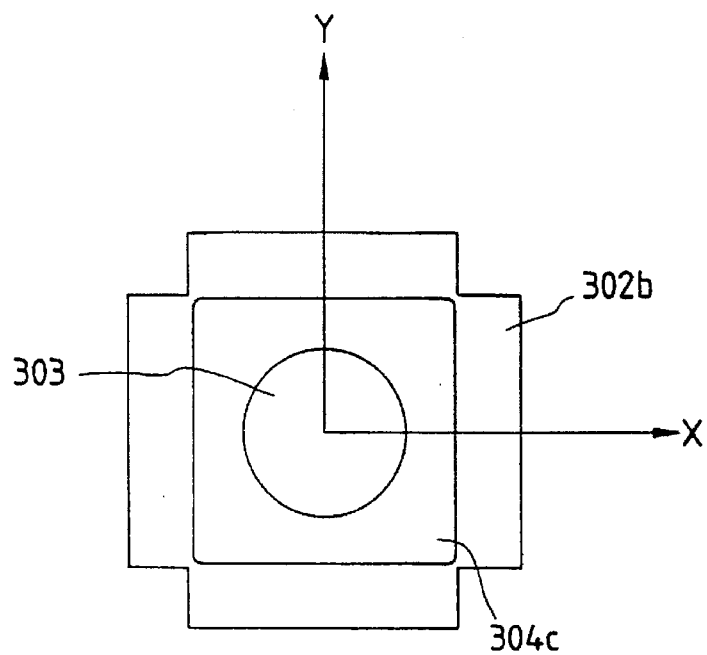
FIG. 26 is a cross-sectional view of the data setting dial in a portion B of FIG. 25.

FIG. 25 is a vertical sectional view of the data setting dial 303 in a portion A of FIG. 24. FIG. 26 is a cross-sectional view of the data setting dial 303 in a portion B of FIG. 25. The data setting dial 303 is supported rotatably on a data setting dial support member 304. A hole edge 302a of the rear cover 302 is interposed in the data setting dial support member 304. An angular sectional portion 304c engages with a cross hole 302b, whereby the data setting dial support member 304 is shiftable in the X and Y directions in FIG. 24. The shiftable-state thereof in the X and Y directions in FIG. 24 is also attained.

Figure 27:
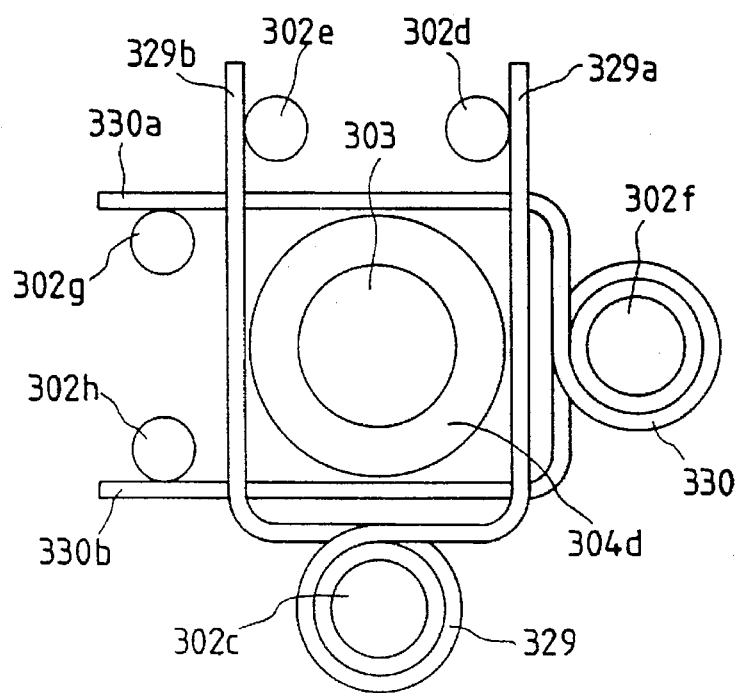
FIG. 27 is a cross-sectional view of the data setting dial in a portion D of FIG. 25.

FIG. 27 is a cross-sectional view of a portion D of FIG. 25. Bosses 302c, 302d, 302e, 302f, 302g, 302h are, as illustrated in FIGS. 25 and 27, are provided inwardly of the rear cover 302. A torsion spring 329 is axially supported around the boss 302c. Spring legs 329a, 329b are caught by the bosses 302d, 302e. Similarly, a torsion spring 330 is axially supported around the boss 302f, and spring legs 330a, 330b are caught by the bosses 302g, 302h. The spring legs 329a, 329b, 330a, 330b are so located as to surround a circular sectional portion 304d of a data setting dial support member 304, and some gaps are formed therebetween.

Figure 28:
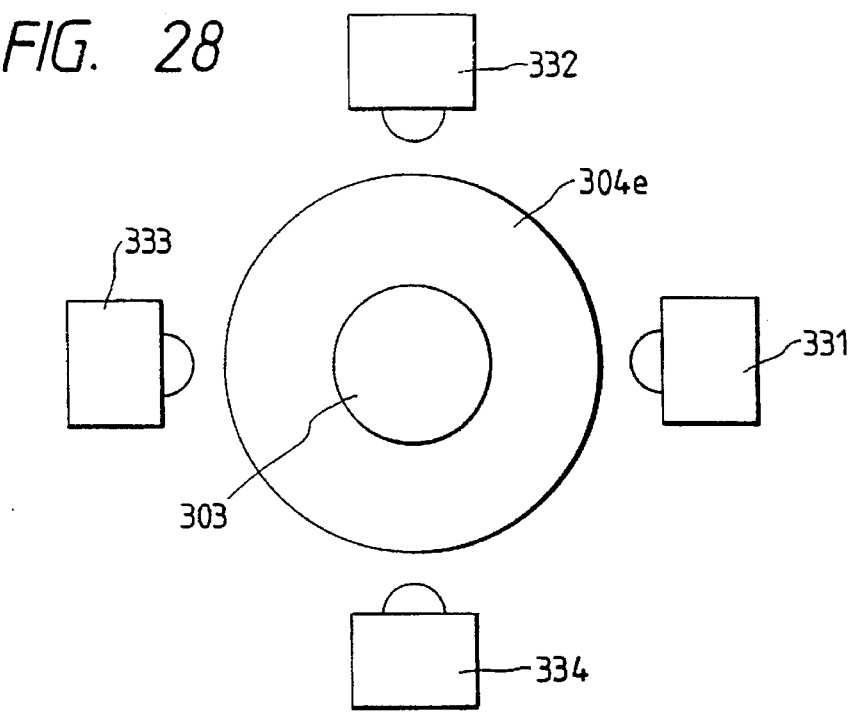
FIG. 28 is a cross-sectional view of the data setting dial in a portion C of FIG. 25.

FIG. 28 is a cross-sectional view of a portion C of FIG. 25. A right edge portion 304e of the data setting dial support member 304 takes a circular shape. As illustrated in FIG. 28, switches 331, 332, 333, 334 are arranged at an interval of 90° in close proximity to the edge surface thereof. These switches 331 to 334 are turned ON when pushing an actuator but turned OFF when separated therefrom. A cover member 338 supports the switches 331 to 334. The cover member 338 engages with key portions 302i, 302j provided inwardly of the rear cover and is thus fixed thereto.

Figure 29:
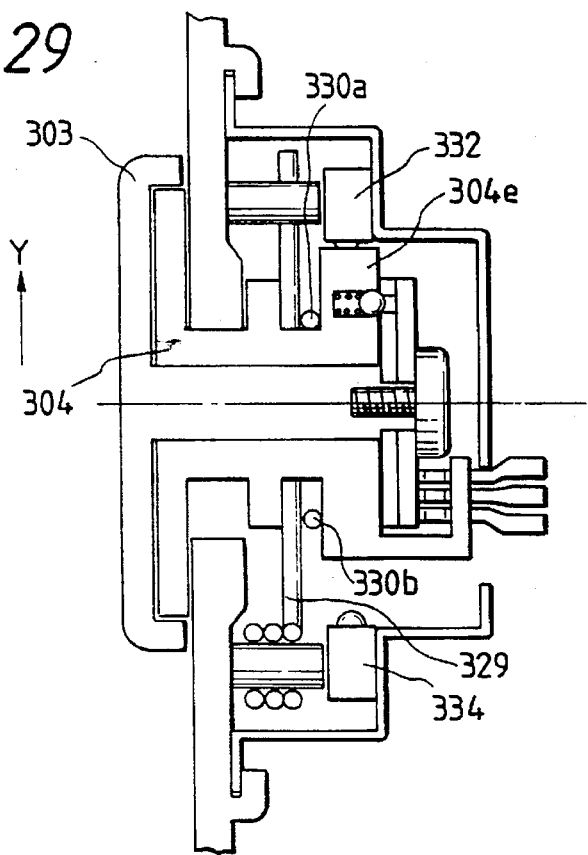
FIG. 29 is a vertical sectional view of the data setting dial when manipulating the data setting dial to shift it in a Y-direction in the fourth embodiment.

FIG. 29 is a vertical sectional view when shifting the data setting dial 303 in the Y direction shown in FIGS. 24 and 26. When the data setting dial 303 is shifted by the thumb of the photographer in the Y direction, the data setting dial support member 304 engages with an angular sectional portion 304c and a cross hole 302b illustrated in FIG. 26 and is thereby shifted in the Y direction, resisting the spring leg 330 shown in FIG. 27. A right edge portion 304e of the data setting dial support member 304 pushes the actuator of the switch 332, with the result that the switch 332 is turned ON. The data setting dial support member 304 is biased by the spring leg 330a in the return direction. Therefore, when stopping the shifting operation of the data setting dial 303, the data setting dial 303 is returned to the original position. The same shifting operation is also performed in the Y and ±X directions, thus turning ON the switch. When canceling the operation, there is returned to the original position by the biasing forces of the torsion springs 329, 330.

Fifth Embodiment

Figure 30:
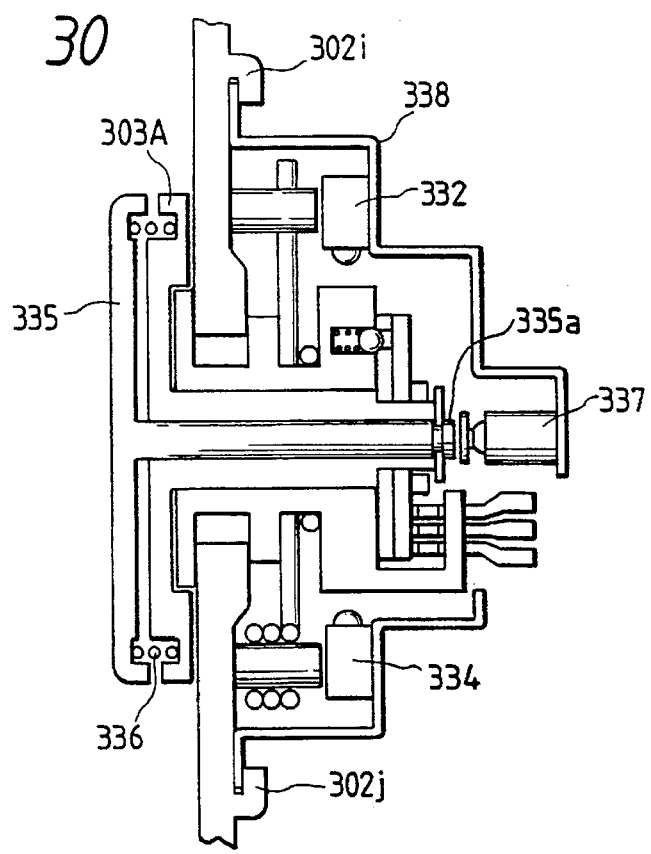
FIG. 30 is a sectional view illustrating a data setting dial in a fifth preferred embodiment according to the present invention.

FIG. 30 is a sectional view illustrating a data setting dial portion in a fifth preferred embodiment according to the present invention. Note that the same constructive elements as those in FIGS. 24 to 29 showing the fourth embodiment are marked with the like symbols, and the explanation is centered on different points.

A data setting dial button 335 is so axially supported as to be shiftable in the axial direction but coaxial with the data setting dial 303A. The dial button 335 is biased leftward in the Figure by a spring 336. A switch 337 is provided in the vicinity of a right edge portion 336a of this data setting dial button 335. The switch 337 is also turned ON When pushing the actuator but turned OFF when separated therefrom. A cover member 338 supports the switches 331 to 334 and 337. The cover member 338 engages with key portions 302i, 302j provided inwardly of the rear cover and is thus fixed thereto. A construction of this embodiment is such that the switch 337 is added to the construction of the fourth embodiment discussed with reference to FIGS. 24 to 29, and, when manipulating the data setting dial 303A while pushing the switch 337, there can be set a different item of data from the one when manipulating the data setting dial 303A without pushing the switch 337. Incidentally, the construction may be also such that the operations of the switches 331 to 334 turned ON when shifted in the ±X- and ±Y-directions remain effective only for the duration of pushing the switch 337.

Figure 31:
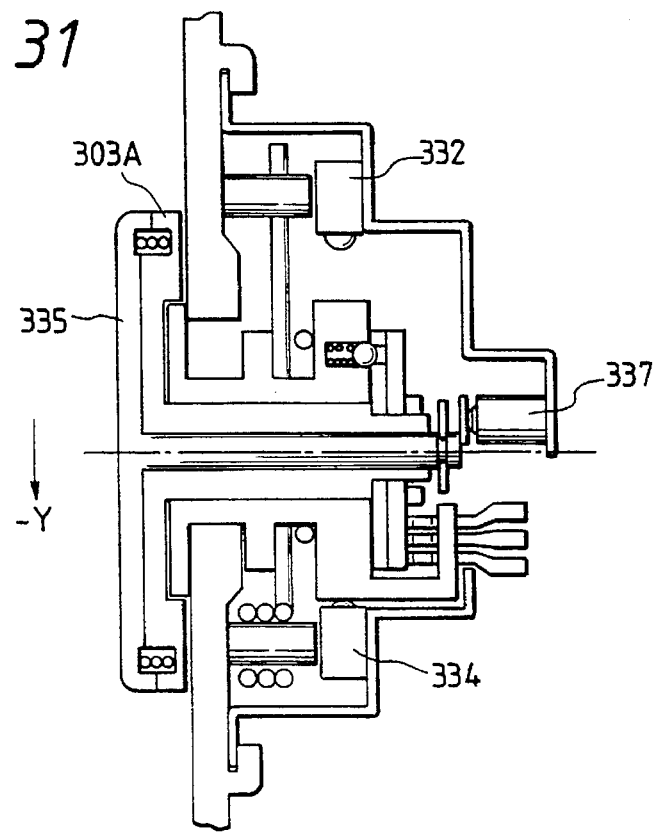
FIG. 31 is a sectional view of the data setting dial when manipulating the data setting dial to shift it in a -Y-direction in the fifth embodiment.

FIG. 31 is a vertical sectional view when shifting the data setting dial 303A shown in FIG. 30 in the Y direction illustrated in FIGS. 24 and 26. In addition to the fourth embodiment discussed with reference to FIG. 29, there can be shifted also in the ±X and ±Y directions for the duration of pushing the switch 337 by the data setting dial button 335.

Sixth Embodiment

Figure 32:
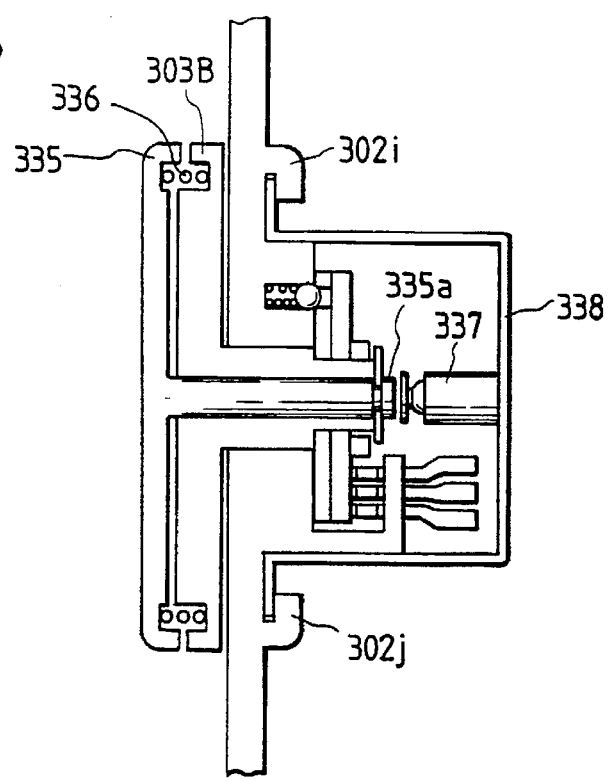
FIG. 32 is a sectional view illustrating a data setting dial in a sixth preferred embodiment according to the present invention.

FIG. 32 is a sectional view of a data setting dial 303B in a sixth preferred embodiment according to the present invention. Note that the same constructive elements as those in FIGS. 24 to 31 illustrating the fourth and fifth embodiments discussed above are marked with the like symbols, and the explanation is centered on different points.

The data setting dial button 335 is so axially supported as to be shiftable in the axial direction but coaxial with a data setting dial 303B. The dial button 335 is biased leftward in the Figure by the spring 336. The switch 337 is provided in the vicinity of the right edge portion 336a of this data setting dial button 335. The switch 337 is turned ON when pushing the actuator but turned OFF when separated therefrom. The cover member 338 supports the switch 337. The cover member 338 engages with the key portions 302i, 302j provided inwardly of the rear cover and is thus fixed thereto. A construction of this embodiment is such that the switches 331 to 334 are removed from the construction of the fifth embodiment illustrated in FIGS. 30 and 31, and, when manipulating the data setting dial 303B while pushing the switch 337, there can be set a different item of data from the one when the switch 337 is not pushed.

Figure 33:
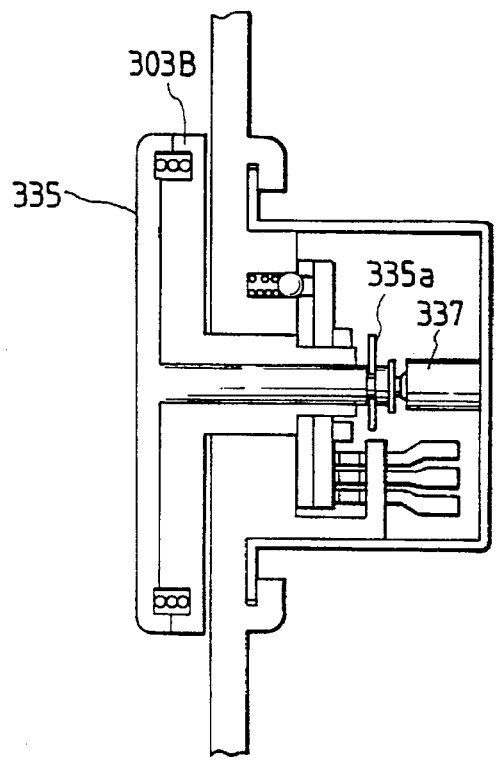
FIG. 33 is a view illustrating a state where a switch is pushed by a data setting dial button.

FIG. 33 illustrates a state where the switch 337 is pushed by the data setting dial button 335. The construction is that when manipulating the data setting dial 303B while pushing the switch 337, there can be set a different item of data from the one when manipulating the data setting dial 303A without pushing the switch 337.

Seventh Embodiment

Figure 34:
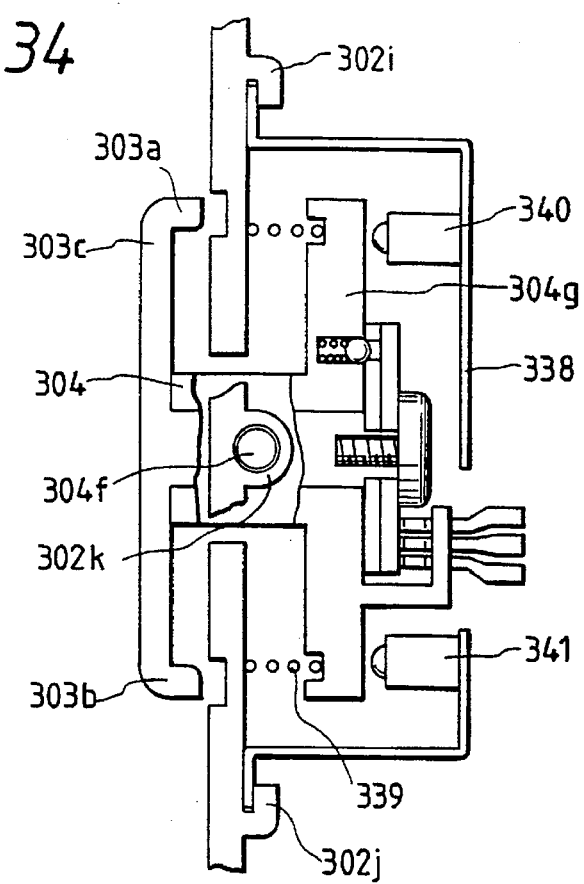
FIG. 34 is a sectional view illustrating a data setting dial in a seventh preferred embodiment according to the present invention.

FIG. 34 is a sectional view of a data setting dial 303C in a seventh preferred embodiment according to the present invention. Note that the same constructive elements as those in FIGS. 24 to 33 illustrating the fourth through sixth embodiments discussed above are marked with the like symbols, and the explanation is centered on different points.

Figure 35:
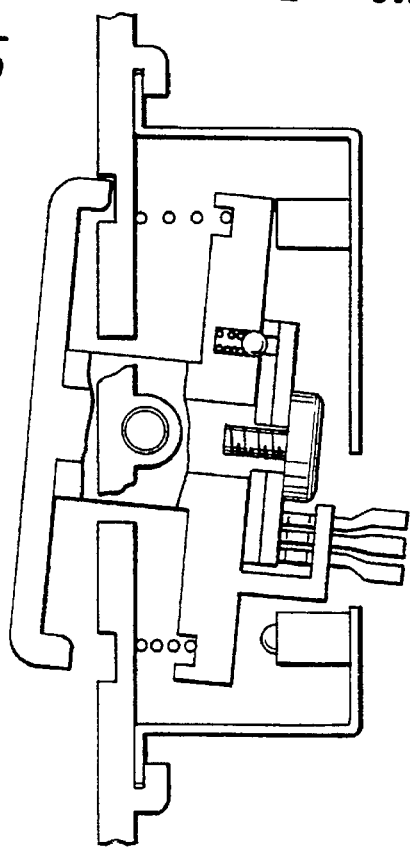
FIG. 35 is a view illustrating an operating state of the data setting dial in the seventh embodiment.

The data setting dial 303C is so supported on the data setting dial support member 304 as to be tiltable on the surface substantially parallel to the finder picture. A tilting direction of this data setting dial 303C is detected, and a region corresponding to this tilting direction is selected. The data setting dial support member 304 has a shaft 304f and is rotatably supported on a bearing 302k of the rear cover 302. A right edge portion 304g of the data setting dial support member 304 receives biasing given by a spring member 339 to keep the parallelism with the rear cover. Switches 340, 341 are provided in the vicinity of the right edge portion 304g of the data setting dial support member 304. The switches 340, 341 are turned ON when pushing the actuator but turned OFF when separated therefrom. The cover member 338 supports the switches 340, 341. The cover member 338 engages with key portions 302i, 302j provided inwardly of the rear cover and is thus fixed thereto. When an upper portion 303a of the data setting dial 303C is pushed by the thumb of the right hand of the photographer, the data setting dial 303C is, as illustrated in FIG. 35, tilted about the shaft 304f, resisting the spring member 339. The right edge portion 304g of the data setting dial support member 304 pushes the actuator of the switch 340, thus turning ON the switch. Further, similarly when pushing a lower portion 303b of the data setting dial 303C, the data setting dial 303C is tilted about the shaft 304f, resisting the spring member 339, and the right edge portion 304g of the data setting dial support member 304 pushes the actuator of the switch 341, thus turning ON the switch. When canceling the pushing operation, the data setting dial 303C is returned to the original position by the spring member 339.

Figure 36:
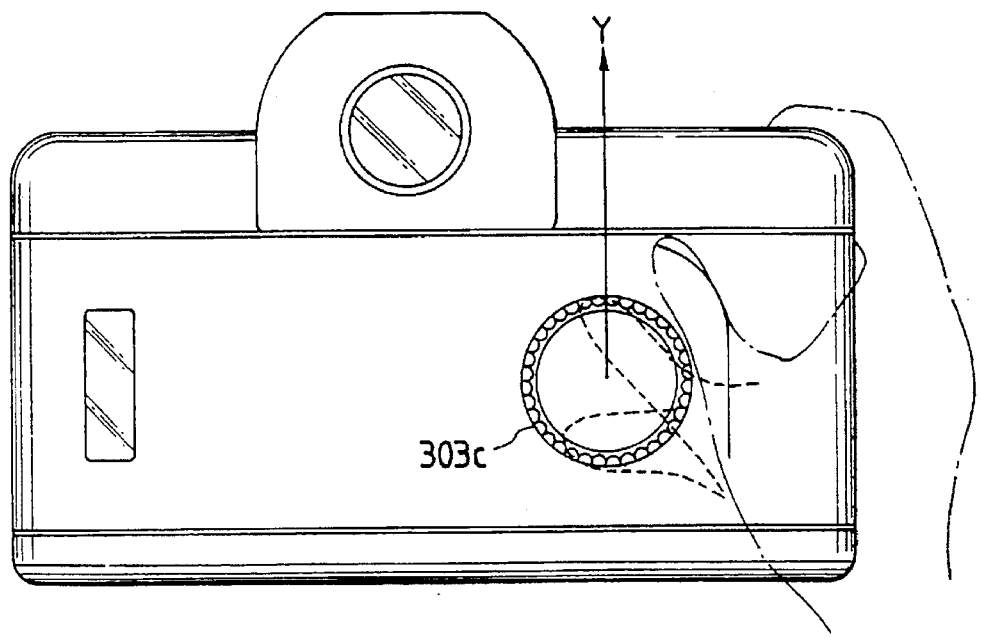
FIG. 36 is a view of assistance in explaining the operation of the data setting dial in the seventh embodiment.
Figure 37:
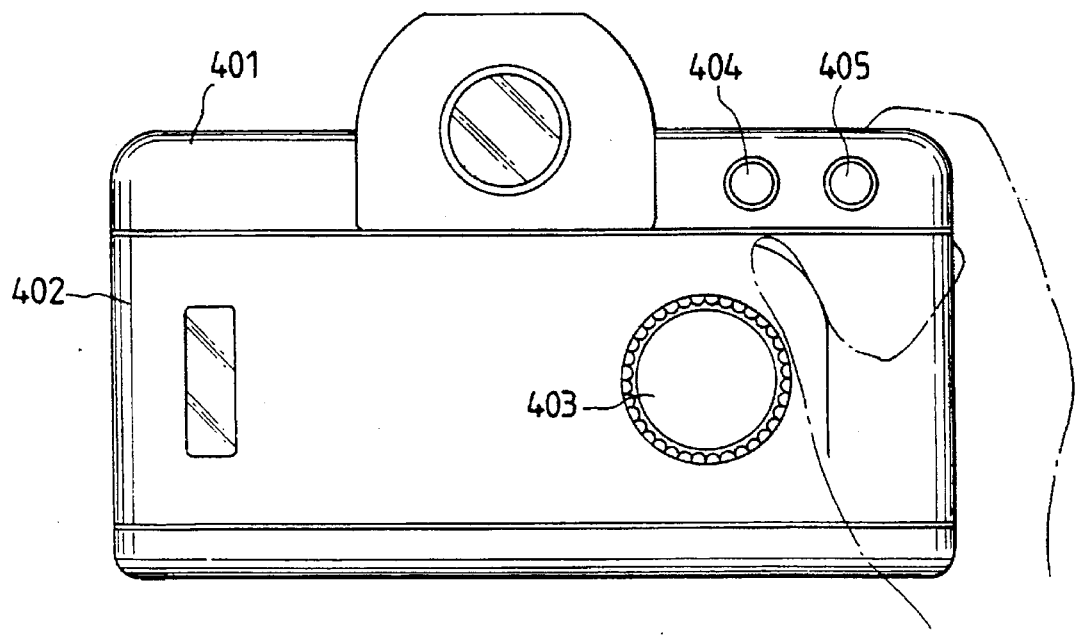
FIG. 37 is a rear view of the camera in which the data setting dial is mounted on the body rear surface.

As indicated by the broken line in FIG. 36, the photographer is able to intrude the ±Y directional edges of the data setting dial 303C with his or her thumb in the direction substantially perpendicular to the sheet surface in FIG. 36.

This embodiment is constructed to take the ±Y directions but may be constructed to take ±X direction or the oblique directions. When turning ON the switch 340 or 341, the data setting dial 303C is operated. At this time, the construction may be such that there can be set a different item of data from the one when turning OFF the switch. The construction may be also such that other items of data are set irrespective of the data setting by the data setting dial 303C.

As discussed above, according to the present invention, the region selection member is provided so that the operating surface of the region selection member is substantially parallel to the finder picture. Hence, the shifting direction of the region selection member coincides with the shifting direction of the selected region of the finder picture. Then, the region can be accurately changed while seeing the selected region displayed on the finder picture, whereby the operability can be improved. Furthermore, in the ordinary single-lens reflex camera, the photographer views through the finder from the rear surface of the camera, and, therefore, the shifting surface of the region selection member is substantially parallelized to the finder picture by providing the region selection member on the rear surface of the camera. The same effects as the above-mentioned are thereby obtained, and, besides, the region selection member can be operated with the thumb while holding the camera, thereby improving the operability.

Further, when intruding the region selection member in the direction orthogonal to the finder picture and operating it on the surface parallel to the finder picture, the focus detection region corresponding to that operating direction is selected. Consequently, the selected region is not changed even when carelessly shifting the region selection member, thus preventing a misoperation.

The region selection member is intruded in the direction orthogonal to the finder picture, and the focus adjusting mode is set by operating the focus adjusting mode selection member. The focus adjusting mode selection member is therefore allowed to serve as a command dial for setting each item of photographing data. This eliminates the necessity for providing a dedicated operation member.

Further, the region selection member serves to both select the focus detection region and select the light metering region, and, hence, there is no necessity for providing the separate dedicated operation member. Also, the focus detection regions are beforehand made corresponding to the light metering regions, and, when the focus detection region is selected by the region selection member, the corresponding light metering region is automatically selected. When the light metering region is selected by the region selection member, the corresponding focus detection region is automatically selected. Accordingly, when selecting either the focus detection region or the light metering region, the focus and the exposure can be automatically set in that selected region, thereby improving the operability.

Moreover, the region selection member also serves as the data setting dial for setting each items of photographing data. This data setting dial is so constructed as to be shiftable or tiltable on the surface substantially parallel to the finder picture. The region is selected corresponding to the shifting or tilting direction thereof. This also eliminates the necessity for providing the dedicated region selection member. It is therefore possible to reduce the costs and set the respective items of photographing data as well as selecting the region while viewing through the finder. The operability is thereby ameliorated.

What is claimed is:

1. A camera detecting a focus by dividing a photographing picture into a plurality of regions, comprising:
    a region selection member to select an arbitrary region from the plurality of regions;
    a focus detecting device to detect a focus adjusting state of a photographing lens in the region selected by said region selection member; and
    a display unit to display the region selected by said region selection member on a finder picture,
    wherein said region selection member is provided so that an operation surface of said region selection member is substantially parallel to the finder picture, and said region selection member has
        a data setting dial to set each item of data in accordance with a rotating direction and a rotational quantity,
        a support member to support said data setting dial in such a manner as to be shiftable or tiltable on the surface substantially parallel to the finder picture, and
        a detection member to detect a shifting or tilting direction of said data setting dial, and wherein a region corresponding to the shifting or tilting direction of said data setting dial is selected.

2. A camera according to claim 1, wherein the finder picture is so set as to be substantially orthogonal to the optical-axis direction of said photographing lens, and
    said region selection member is provided on a rear surface of said camera.

3. A camera according to claim 1, wherein said region selection member is made shiftable in a direction substantially orthogonal to the finder picture, said region selection member is intruded in a direction substantially right-angled to the finder picture, and said region selection member selects, when operated on the surface substantially parallel to the finder picture, a region corresponding to this operating direction.

4. A camera according to claim 1, further comprising:

a focus adjusting mode selection member to select a first focus adjusting mode in which a focus of said photographing lens is adjusted based on the focus adjusting state of said photographing lens that is detected in the focus detection region selected by said region selection member and a second focus adjusting mode in which the focus of said photographing lens is adjusted by a predetermined algorithm on the basis of the focus adjusting state of said photographing lens that is detected in each of the plurality of focus detection regions; and a focus adjusting mode setting device to set the selected focus adjusting mode when said region selection member is intruded in the direction substantially right-angled to the finder picture and when said focus adjusting mode selection member is selectively operated.

5. A camera metering the light by dividing a photographing picture into a plurality of regions, comprising:

a region selection member to select an arbitrary region from the plurality of regions;

a light metering device to detect a luminance of an object in the region selected by said region selection member; and a display unit to display the region selected by said region selection member on a finder picture, wherein said region selection member is provided so that an operating surface of said region selection member is substantially parallel to the finder picture.

6. A camera according to claim 5, wherein said region selection member has:

a data setting dial to set each item of data in accordance with a rotating direction and a rotational quantity;

a support member to support said data setting dial in such a manner as to be shiftable on the surface substantially parallel to the finder picture; and a detection member to detect a shifting direction of said data setting dial, and wherein a region corresponding to the shifting direction of said setting dial is selected.

7. A camera according to claim 5, wherein said region selection member has:

a data setting dial to set each item of data in accordance with a rotating direction and a rotational quantity;

a support member to support said data setting dial in such a manner as to be tiltable on the surface substantially parallel to the finder picture; and a detection member to detect a tilting direction of said data setting dial, and wherein a region corresponding to the tilting direction of said data setting dial is selected.

8. A camera detecting a focus by dividing a photographing picture into a plurality of regions and metering the light by dividing the photographing picture into the plurality of regions, comprising:

a region selection member to select an arbitrary region from the plurality of regions;

a focus detecting device to detect a focus adjusting state of a photographing lens in the region selected by said region selection member;

a light metering device to detect a luminance of an object in the region selected by said region selection member; and a display unit to display the region selected by said region selection member on a finder picture, wherein said region selection member is provided so that an operating surface of said region selection member is substantially parallel to the finder picture, and said region selection member has a data setting dial to set each item of data in accordance with a rotating direction and a rotational quantity, a support member to support said data setting dial in such a manner as to be shiftable or tiltable on the surface substantially parallel to the finder picture, and a detection member to detect a shifting or tilting direction of said data setting dial, and wherein a region corresponding to the shifting or tilting direction of said data setting dial is selected.

9. A camera according to claim 8, wherein the focus-detected region is previously made corresponding to the light-metered region, and said light metering device detects, when the focus-detected region is selected by said region selection member, the luminance of the object in the region corresponding to the focus-detected region.

10. A camera according to claim 8, wherein the focus-detected region is previously made corresponding to the light-metered region, and said focus detecting device detects, when the light-metered region is selected by said region selection member, the focus adjusting state of said photographing lens in the region corresponding to the light-metered region.

11. A camera recognizing a photographing picture as a surface divided into a plurality of regions, comprising:

a region selection member having a shiftable or tiltable dial to select a specified region from the plurality of regions; and a display unit, having a plurality of display regions on a display surface, to display the specified region, wherein the specified region displayed on the display surface is, when said region selection member is externally operated, shifted in a direction substantially parallel to an operating direction of said region selection member.

12. A camera according to claim 11, wherein the display surface of said display unit is provided to perpendicularly intersect the optical axis of a photographing optical system.

13. A camera according to claim 11, wherein the display surface of said display unit is a finder picture, and the specified region is, when said region selection member is externally operated, shifted in the operating direction of said region selection member on the finder picture.

14. A camera according to claim 11, further comprising a focus detecting device to detect a focus adjusting state of a photographing lens in the region selected by said region selection member.

15. A camera according to claim 11, further comprising a light metering device to detect a luminance of an object in the region selected by said region selection member.

16. A camera dividing a photographing picture into a plurality of regions, comprising:

a region selection member having a dial shiftable or tiltable on a plane substantially parallel to a display to select at least one of the plurality of regions, and rotatable to set photographing data items; and a photographing device to photograph an image using the at least one of the plurality of regions selected by said region selection member and the photographing data items.

17. A camera according to claim 16 wherein the at least one of the plurality of regions is selected by said region selection member as a focusing region.

18. A camera according to claim 16 wherein the at least one of the plurality of regions is selected by said region selection member as a photometering region.

* * * * *